US012567703B2

(12) United States Patent
Takeshita et al.

(10) Patent No.: US 12,567,703 B2
(45) Date of Patent: Mar. 3, 2026

(54) CONNECTOR ASSEMBLY

(71) Applicant: Japan Aviation Electronics Industry, Limited, Tokyo (JP)

(72) Inventors: Takahiro Takeshita, Tokyo (JP); Hiroatsu Nakajima, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 281 days.

(21) Appl. No.: 18/386,299

(22) Filed: Nov. 2, 2023

(65) Prior Publication Data

US 2024/0204457 A1 Jun. 20, 2024

(30) Foreign Application Priority Data

Dec. 16, 2022 (JP) ................................ 2022-201596

(51) Int. Cl.
*H01R 13/629* (2006.01)
*H01R 13/502* (2006.01)

(52) U.S. Cl.
CPC ..... *H01R 13/62966* (2013.01); *H01R 13/502* (2013.01); *H01R 13/62955* (2013.01)

(58) Field of Classification Search
CPC ............ H01R 13/62966; H01R 13/502; H01R 13/62955; H01R 13/6275; H01R 13/639; H01R 13/508; H01R 13/516; H01R 13/533
See application file for complete search history.

(56) References Cited

U.S. PATENT DOCUMENTS 5,154,629 A * 10/1992 Carver ................. G02B 6/3893 439/372
9,564,710 B2 2/2017 Ebihara
9,692,158 B1 6/2017 Vinther et al.
9,871,320 B2 1/2018 Tezgurler
(Continued)

FOREIGN PATENT DOCUMENTS

JP 4137677 B2 8/2008
JP 2011-023201 A 2/2011
(Continued)

OTHER PUBLICATIONS

Extended European Search Report of Application No. 23210283.0, dated May 21, 2024.

*Primary Examiner* — Abdullah A Riyami
*Assistant Examiner* — Nader J Alhawamdeh
(74) *Attorney, Agent, or Firm* — Collard & Roe, P.C.

(57) ABSTRACT

A connector assembly comprises a first connector and a second connector. The first connector comprises a first housing. The first housing is provided with an engaged portion. The second connector comprises a second housing, a lock lever and a spring. The second housing is provided with a first axis portion. The lock lever is provided with a second axis portion and an engaging portion. The engaging portion is positioned beyond the engaged portion in a first direction when the lock lever is positioned at a lock position under a mated state where the first connector and the second connector are mated with each other. The spring urges the lock lever to be moved toward the lock position. When the lock lever is positioned at the lock position, the spring urges the second axis portion to be moved in a second direction.

15 Claims, 21 Drawing Sheets

(56) References Cited

U.S. PATENT DOCUMENTS

| | | | | |
|---|---|---|---|---|
| 11,699,876 | B2 | 7/2023 | Matsuura | |
| 2014/0273585 | A1 | 9/2014 | Dang | |
| 2015/0037997 | A1* | 2/2015 | McGivern | H01R 13/6273<br>439/352 |
| 2024/0204457 | A1* | 6/2024 | Takeshita | H01R 13/62955 |
| 2025/0105554 | A1* | 3/2025 | Takagi | H01R 13/6273 |

FOREIGN PATENT DOCUMENTS

| | | | |
|---|---|---|---|
| JP | 2016-091594 | A | 5/2016 |
| JP | 2022-116494 | A | 8/2022 |

* cited by examiner

CONNECTOR ASSEMBLY

CROSS REFERENCE TO RELATED APPLICATIONS

This application is based on and claims priority under 35 U.S.C. § 119 to Japanese Patent Applications No. JP 2022-201596 filed Dec. 16, 2022, the contents of which are incorporated herein in their entirety by reference.

BACKGROUND OF THE INVENTION

This invention relates to a connector assembly comprising a first connector and a second connector.

As shown in FIGS. 40 and 41, JP-A 2016-91594 (Patent Document 1) discloses a lever-type connector 900, or a connector assembly 900, which comprises a receptacle 910, or a first connector 910, and a plug 920, or a second connector 920. The first connector 910 has a receptacle shell 912. An outer surface of the receptacle shell 912 is formed with racks 9122. The second connector 920 has a plug housing 922 and a lever 924. The lever 924 is attached to the plug housing 922 so as to be rotatable relative to the plug housing 922. As shown in FIG. 42, the lever 924 has pinions 9242. Referring to FIGS. 40 to 42, when the second connector 920 is inserted into the first connector 910 and the lever 924 is rotated counterclockwise, each of the racks 9122 and a corresponding one of the pinions 9242 are meshed with each other to function as a so-called rack-and-pinion system so that the second connector 920 and the first connector 910 approach each other to be mated with each other.

The connector assembly 900 of Patent Document 1 has a drawback that, when the connector assembly 900 is used in a high vibration environment, both components of the first connector 910 and the second connector 920, which are mated with each other, are unstable so that noise or/and sympathetic vibration is/are easily generated.

SUMMARY OF THE INVENTION

It is therefore an object of the present invention to provide a connector assembly which prevents both components of a first connector and a second connector, which are mated with each other, from being unstable when the connector assembly is used in a high vibration environment.

One aspect of the present invention provides a connector assembly comprising a first connector and a second connector. The second connector is mateable with the first connector along a first direction. The second connector is removable from the first connector along a second direction opposite to the first direction. The first connector comprises a first housing. The first housing is provided with an engaged portion. The second connector comprises a second housing, a lock lever and a spring. The second housing is provided with a first axis portion. The lock lever is attached to the second housing so as to be rotatable between a lock position and an unlock position. The lock lever is provided with a second axis portion and an engaging portion. The second axis portion is combined with the first axis portion. The engaging portion is positioned beyond the engaged portion in the first direction when the lock lever is positioned at the lock position under a mated state where the first connector and the second connector are mated with each other. The second connector is removable from the first connector when the lock lever is positioned at the unlock position under the mated state. The spring is attached to both the second housing and the lock lever. The spring urges the lock lever to be moved toward the lock position. When the lock lever is positioned at the lock position, the spring urges the second axis portion to be moved in the second direction.

The connector assembly of the present invention is configured as follows: the engaging portion of the lock lever is positioned beyond the engaged portion of the first housing in the first direction when the lock lever is positioned at the lock position under the mated state where the first connector and the second connector are mated with each other; the spring is attached to both the second housing and the lock lever; the spring urges the lock lever to be moved toward the lock position; and, when the lock lever is positioned at the lock position, the spring urges the second axis portion to be moved in the second direction. Accordingly, when the lock lever is positioned at the lock position under the mated state where the first connector and the second connector are mated with each other, the engaging portion of the lock lever is pressed against the engaged portion of the first housing of the first connector and thereby both components of the first connector and the second connector are prevented from being unstable. Specifically, the connector assembly of the present invention prevents the both components of the first connector and the second connector, which are mated with each other, from being unstable when the connector assembly is used in a high vibration environment.

An appreciation of the objectives of the present invention and a more complete understanding of its structure may be had by studying the following description of the preferred embodiment and by referring to the accompanying drawings.

Figure 1:
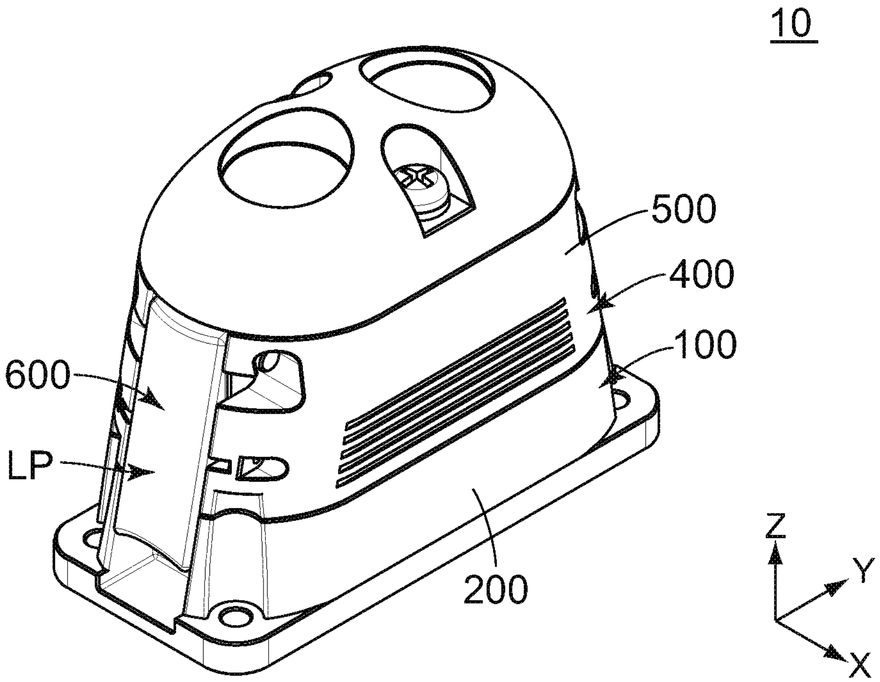
FIG. 1 is an upper, perspective view showing a connector assembly according to a first embodiment of the present invention. In the figure, a first connector and a second connector are in a mated state where the first connector and the second connector mated with each other, and a lock lever is positioned at a lock position.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

Figure 9:
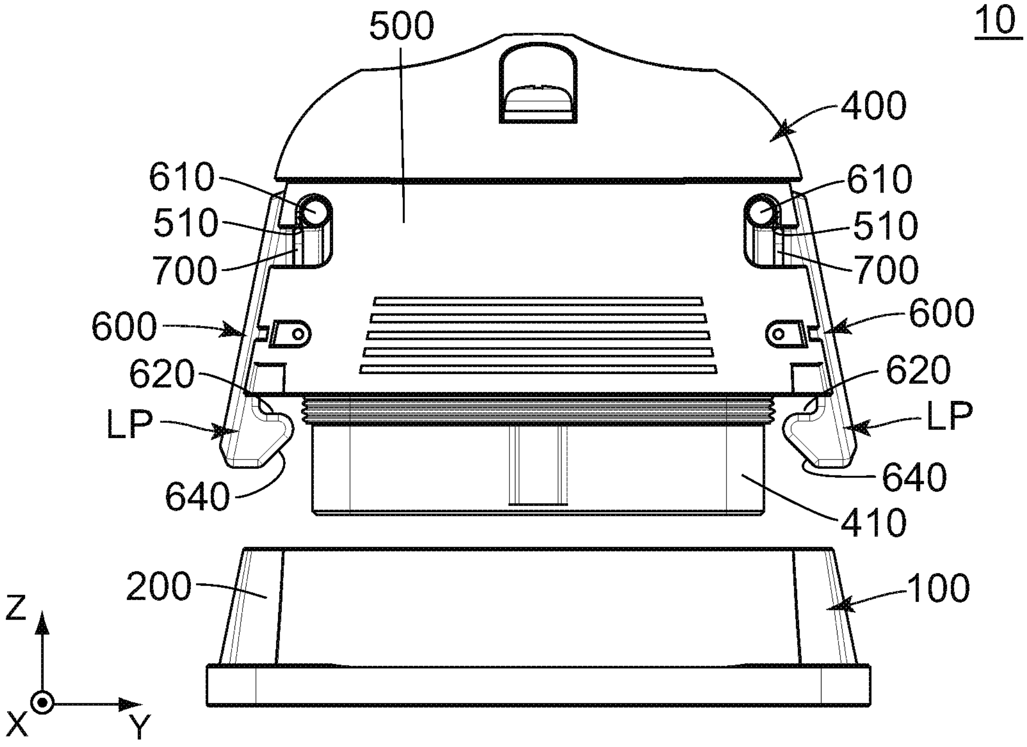
FIG. 9 is another front view showing the connector assembly of FIG. 2. In the figure, the first connector and the second connector are in an unmated state where the first connector and the second connector are unmated with each other, and the lock lever is positioned at the lock position.
Figure 10:
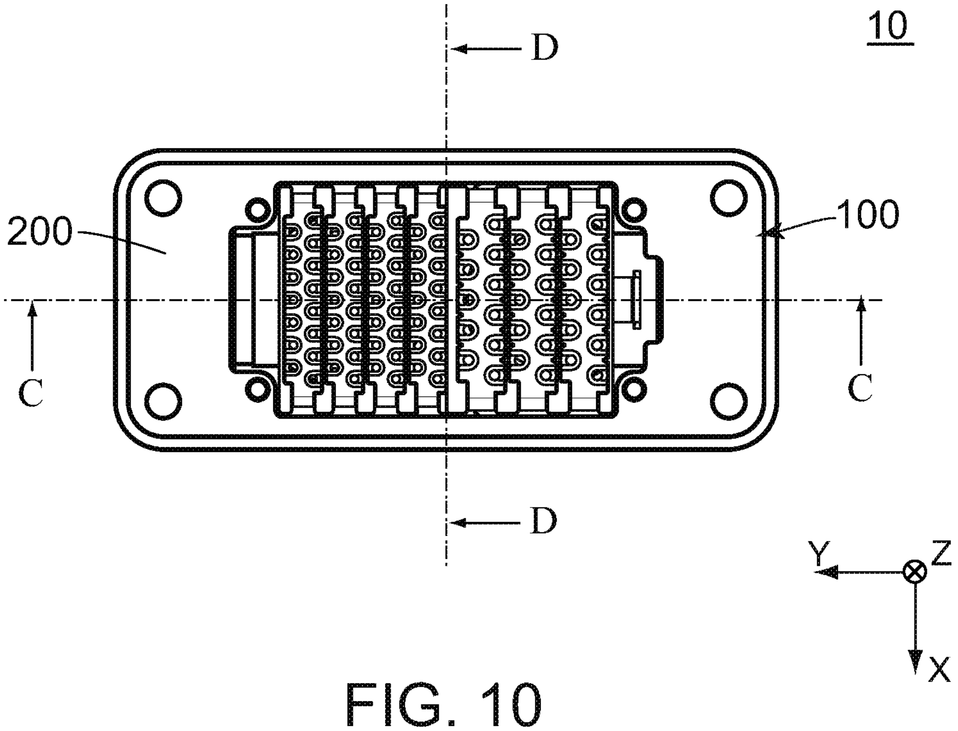
FIG. 10 is a bottom view showing the connector assembly of FIG. 9.

As shown in FIG. 9, a connector assembly 10 according to a first embodiment of the present invention comprises a first connector 100 and a second connector 400.

Figure 2:
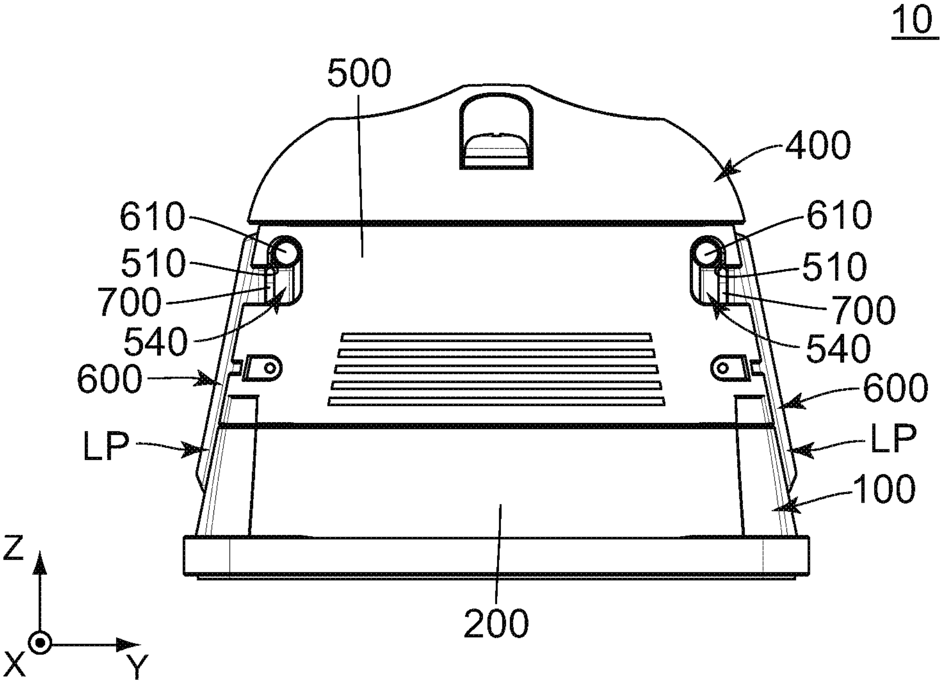
FIG. 2 is a front view showing the connector assembly of FIG. 1.
Figure 3:
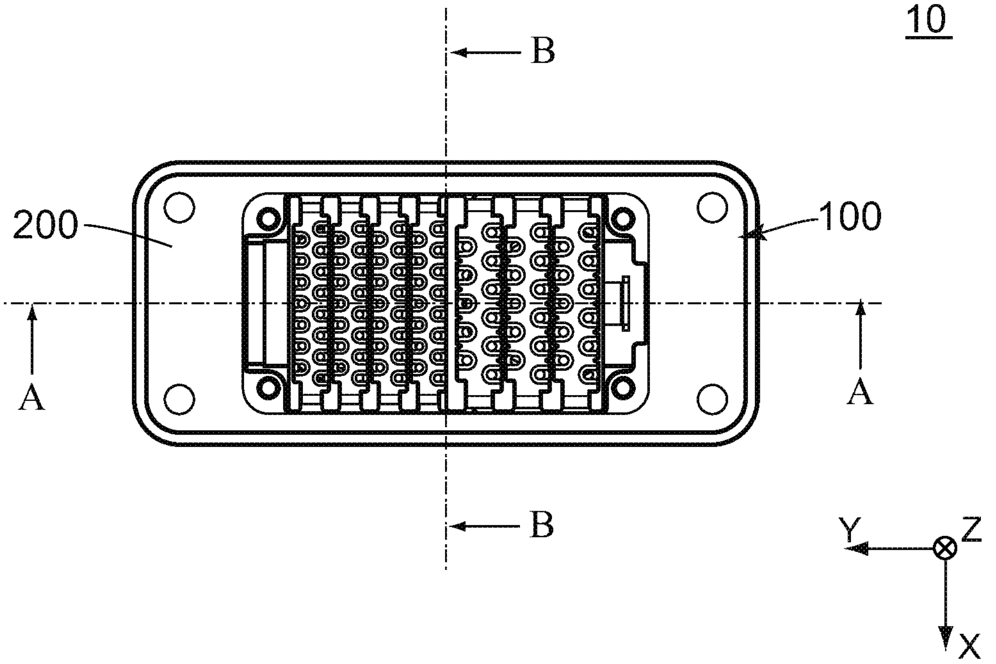
FIG. 3 is a bottom view showing the connector assembly of FIG. 1.

Referring to FIGS. 2 and 9, the first connector 100 of the present embodiment is mateable with the second connector 400 along a second direction and is removable from the second connector 400 along a first direction opposite to the second direction. In the present embodiment, the first direction is downward while the second direction is upward. In the figure, downward is shown as a negative Z-direction while upward is shown as a positive Z-direction.

Figure 33:
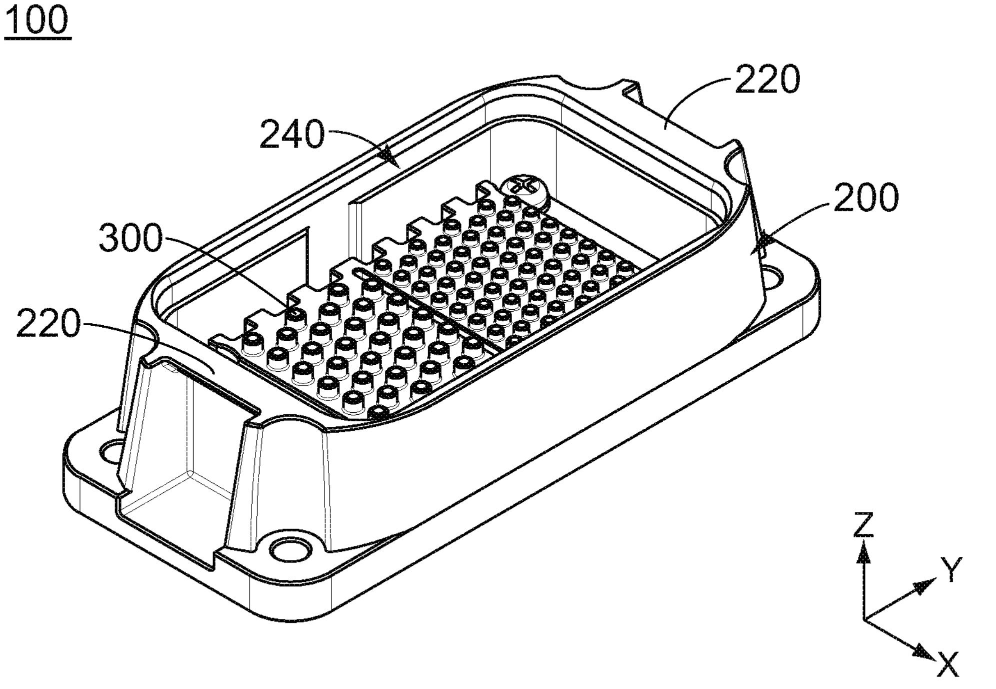
FIG. 33 is an upper, perspective view showing the first connector which is included in the connector assembly of FIG. 1.

As shown in FIG. 33, the first connector 100 comprises a first housing 200 and a plurality of first contacts 300.

Figure 11:
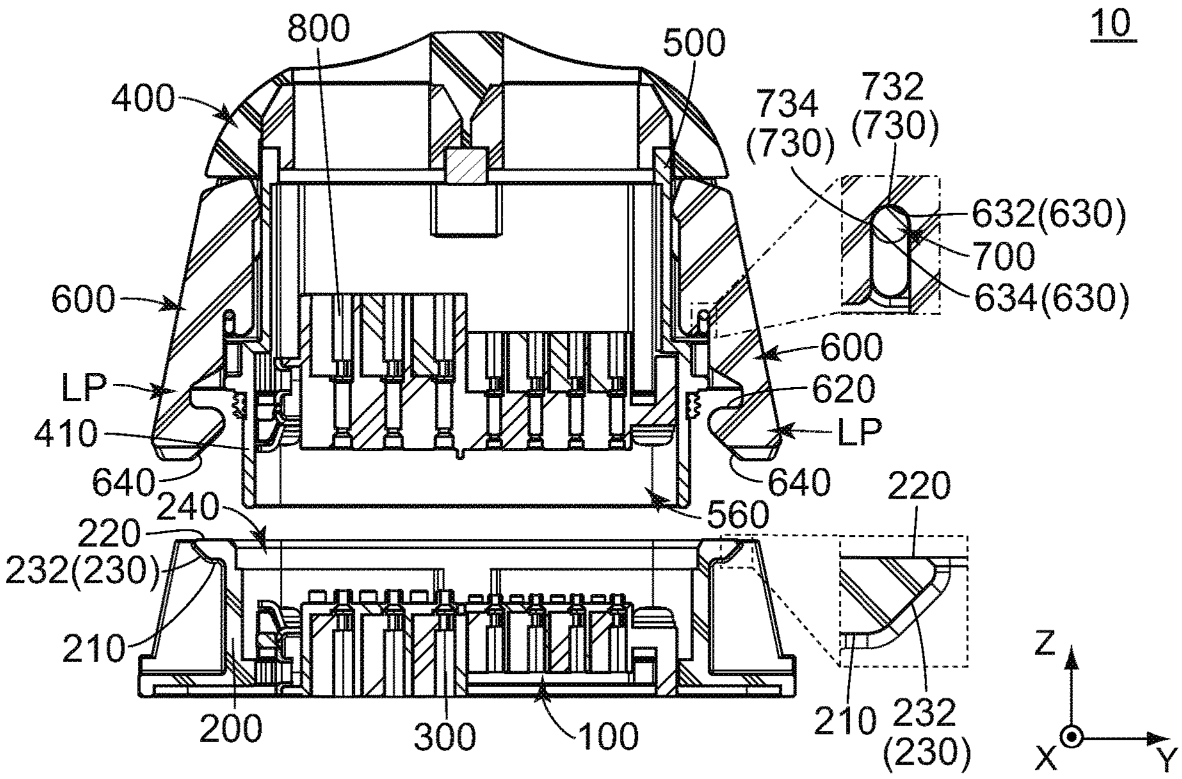
FIG. 11 is a cross-sectional view showing the connector assembly of FIG. 10, taken along line C-C. In the figure, a part of the first connector and a part of the second connector are enlarged and illustrated.
Figure 12:
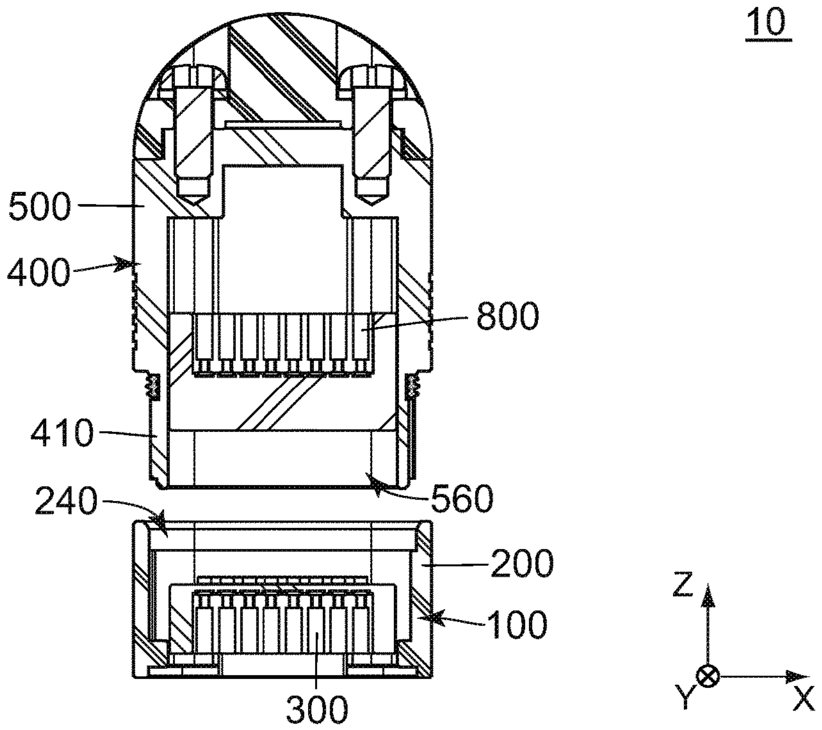
FIG. 12 is a cross-sectional view showing the connector assembly of FIG. 10, taken along line D-D.

Referring to FIG. 33, the first housing 200 of the present embodiment is made of insulator. As shown in FIG. 11, the first housing 200 is provided with two engaged portions 210.

As shown in FIG. 11, the engaged portions 210 of the present embodiment are positioned at opposite sides, respectively, of the first housing 200 in a width direction perpendicular to the first direction. In the present embodiment, the width direction is a Y-direction. Each of the engaged portions 210 is a surface facing in the first direction. In other words, each of the engaged portions 210 is the surface facing downward in an up-down direction. In the present embodiment, the up-down direction is a Z-direction.

As shown in FIG. 11, the first housing 200 is further provided with two intersecting portions 230.

As shown in FIG. 11, each of the intersecting portions 230 of the present embodiment has a surface 232 which intersects with the second direction. The surface 232 of the intersecting portion 230 neighbors to the engaged portion 210. The intersecting portions 230 correspond to the engaged portions 210, respectively. The surface 232 of each of the intersecting portions 230 neighbors to the corresponding engaged portion 210 in the width direction. The surface 232 of each of the intersecting portions 230 is positioned outward of the corresponding engaged portion 210 in the width direction.

As shown in FIG. 33, the first housing 200 is further provided with two second abutment portions 220.

As shown in FIG. 11, each of the second abutment portions 220 of the present embodiment faces in the second direction. In other words, each of the second abutment portions 220 faces upward in the up-down direction. Each of the second abutment portions 220 is a plane perpendicular to the second direction. Each of the second abutment portions 220 is positioned beyond any of the engaged portions 210 in the second direction. The second abutment portions 220 correspond to the engaged portions 210, respectively. Each of the second abutment portions 220 is positioned beyond the corresponding the engaged portion 210 in the width direction.

As shown in FIG. 33, the first housing 200 has a mating portion accommodating portion 240.

As shown in FIG. 33, the mating portion accommodating portion 240 of the present embodiment is a recess which is recessed in the first direction. As shown in FIG. 11, the mating portion accommodating portion 240 is positioned between the two engaged portions 210 in the width direction. The mating portion accommodating portion 240 is positioned between the two intersecting portions 230 in the width direction. The mating portion accommodating portion 240 is positioned between the two second abutment portions 220 in the width direction.

Figure 34:
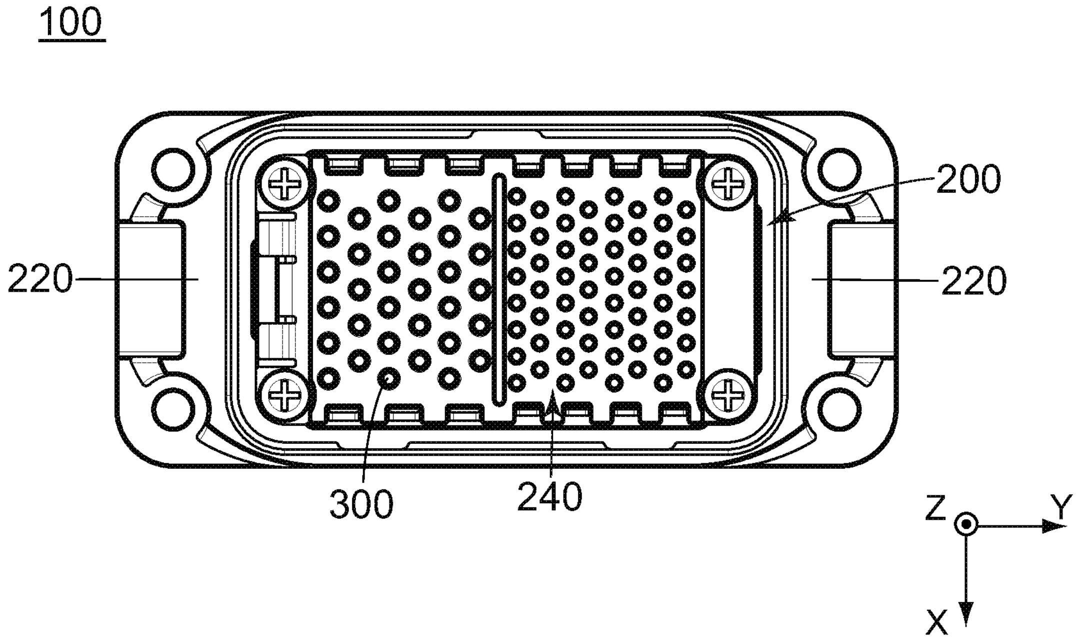
FIG. 34 is a top view showing the first connector of FIG. 33.
Figure 35:
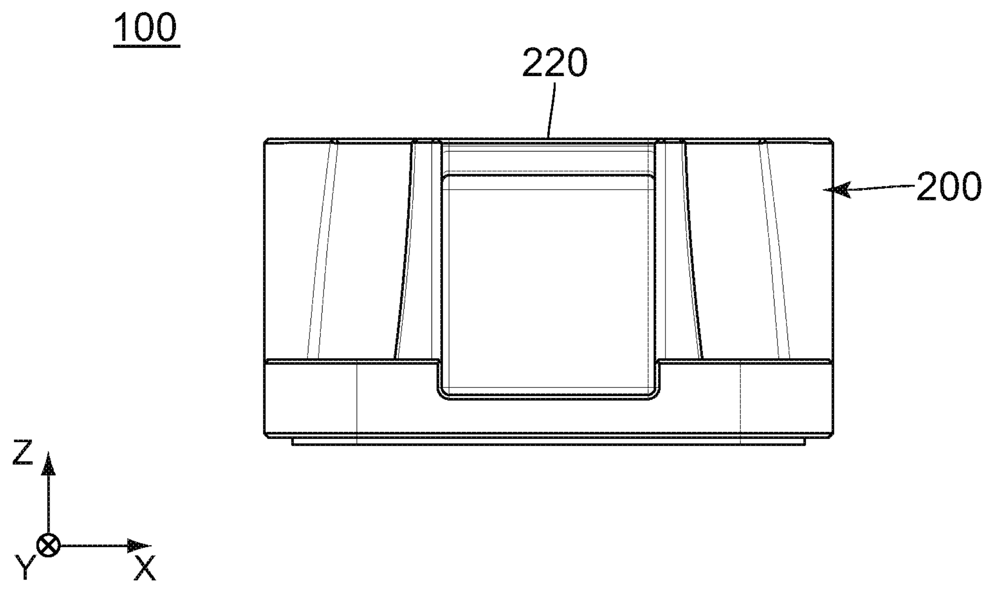
FIG. 35 is a side view showing the first connector of FIG. 33.

Referring to FIG. 34, each of the first contacts 300 of the present embodiment is made of metal. Each of the first contacts 300 is held by the first housing 200. A part of each of the first contacts 300 is exposed in the mating portion accommodating portion 240. As shown in FIG. 11, each of the engaged portions 210 is positioned beyond any of the first contacts 300 in the second direction. In other words, each of the engaged portions 210 is positioned above any of the first contacts 300 in the up-down direction. Each of the intersecting portions 230 is positioned beyond any of the first contacts 300 in the second direction. In other words, each of the intersecting portions 230 is positioned above any of the first contacts 300 in the up-down direction. Each of the second abutment portions 220 is positioned beyond any of the first contacts 300 in the second direction. In other words, each of the second abutment portions 220 is positioned above any of the first contacts 300 in the up-down direction.

Figure 13:
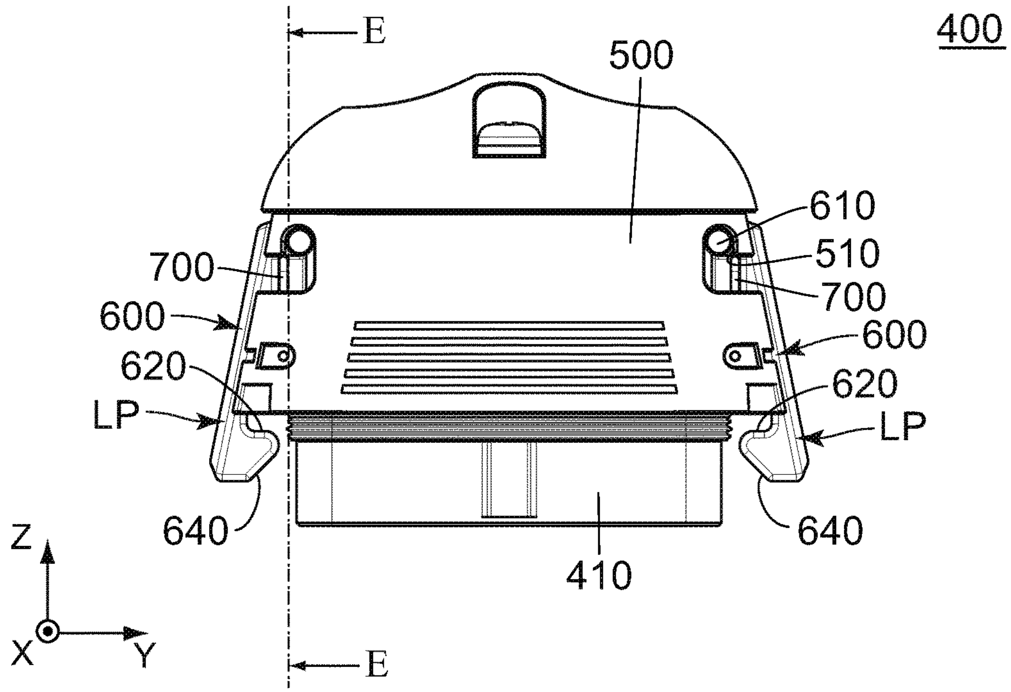
FIG. 13 is a front view showing the second connector which is included in the connector assembly of FIG. 9.

Referring to FIGS. 2 and 9, the second connector 400 of the present embodiment is mateable with the first connector 100 along the first direction and is removable from the first connector 100 along the second direction opposite to the first direction. As shown in FIG. 13, the second connector 400 has a mating portion 410.

Figure 4:
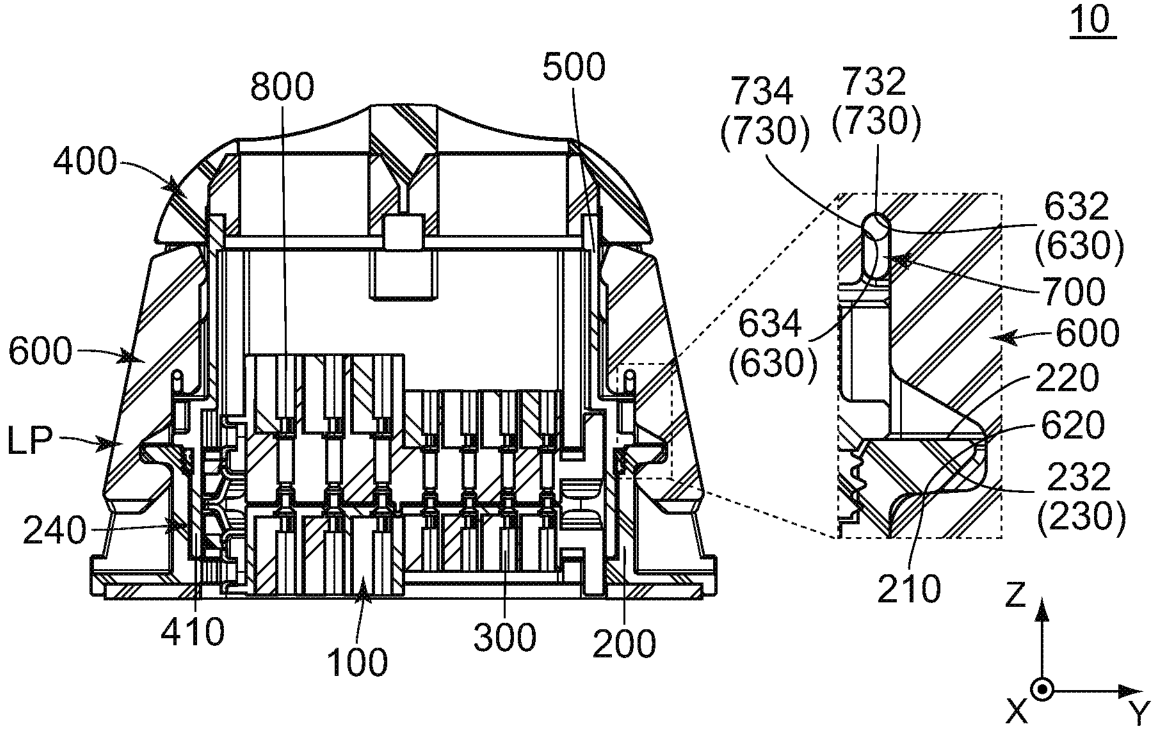
FIG. 4 is a cross-sectional view showing the connector assembly of FIG. 3, taken along line A-A. In the figure, a part of the connector assembly is enlarged and illustrated.
Figure 5:
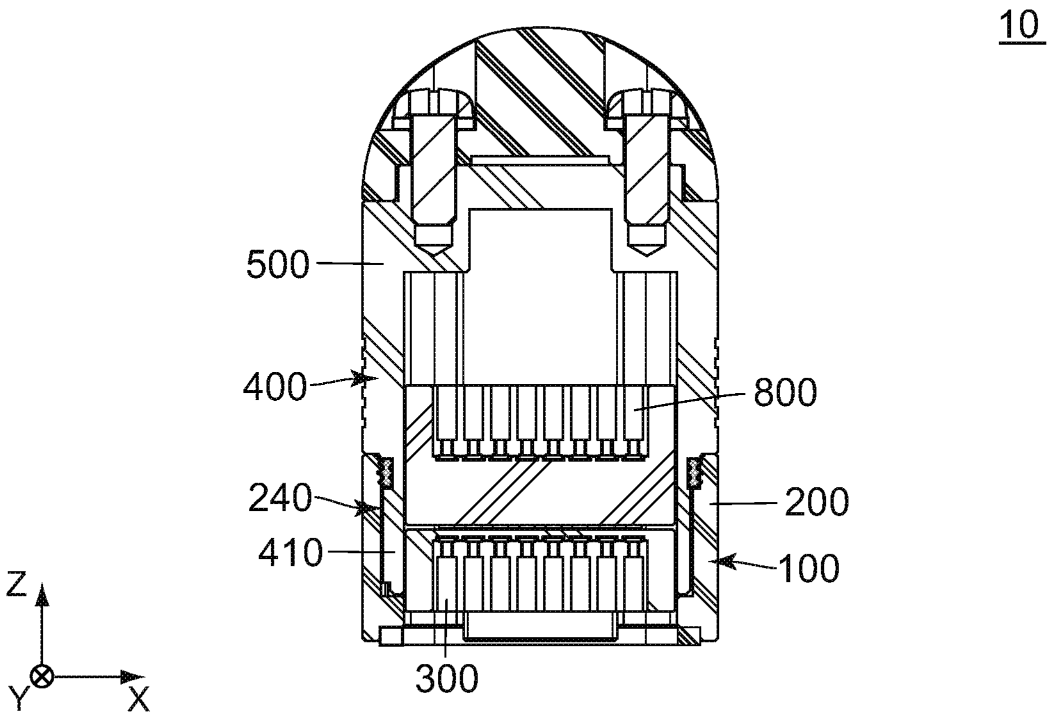
FIG. 5 is a cross-sectional view showing the connector assembly of FIG. 3, taken along line B-B.
Figure 6:
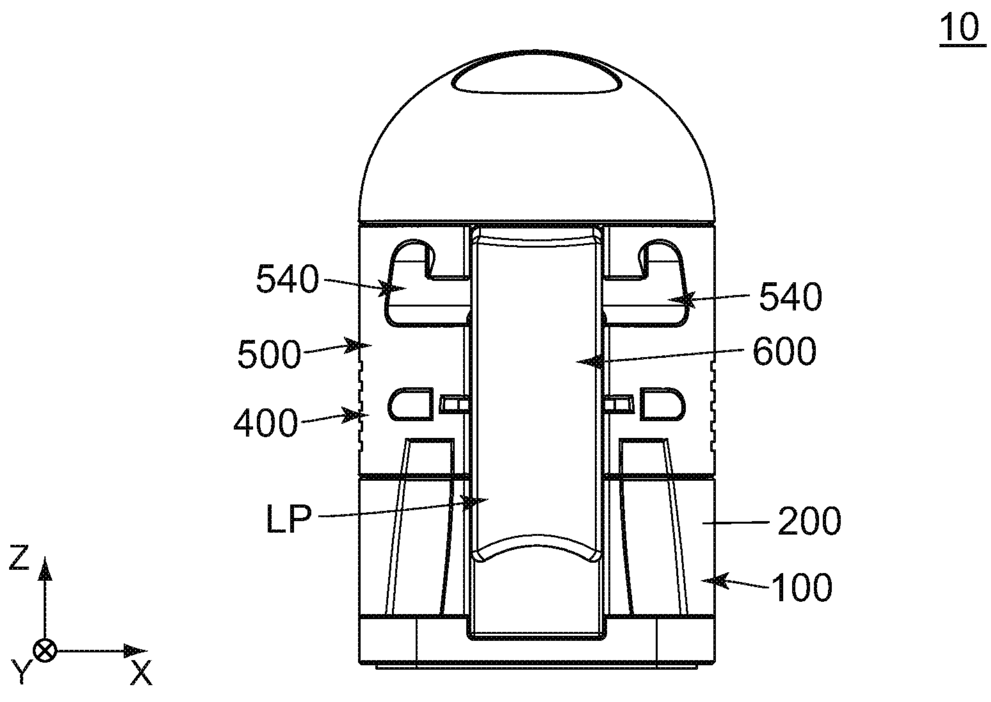
FIG. 6 is a side view showing the connector assembly of FIG. 1.

As shown in FIG. 13, the mating portion 410 of the present embodiment is positioned at an end portion of the second connector 400 in the first direction. In other words, the mating portion 410 of the present embodiment is positioned at a lower end of the second connector 400 in the up-down direction. Referring to FIGS. 4 and 11, the mating portion 410 is accommodated in the mating portion accommodating portion 240 of the first connector 100 when the first connector 100 and the second connector 400 are mated with each other.

Figure 17:
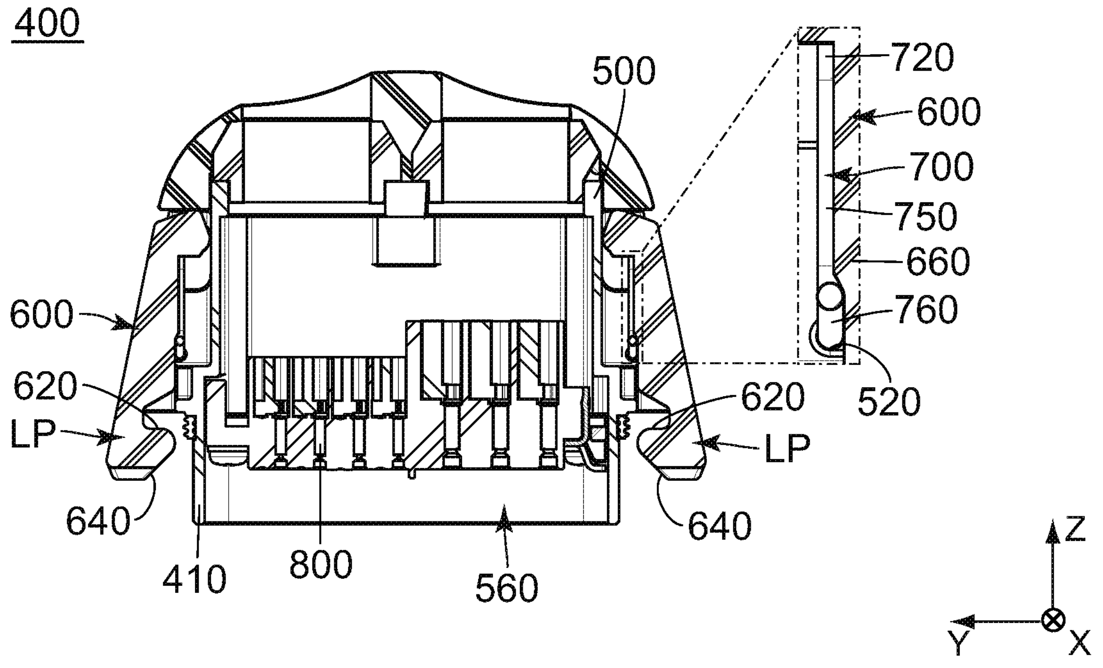
FIG. 17 is a cross-sectional view showing the second connector of FIG. 16, taken along line F-F. In the figure, a part of the second connector is enlarged and illustrated.

As shown in FIGS. 13 and 17, the second connector 400 comprises a second housing 500, two lock levers 600, two springs 700 and a plurality of second contacts 800.

Figure 14:
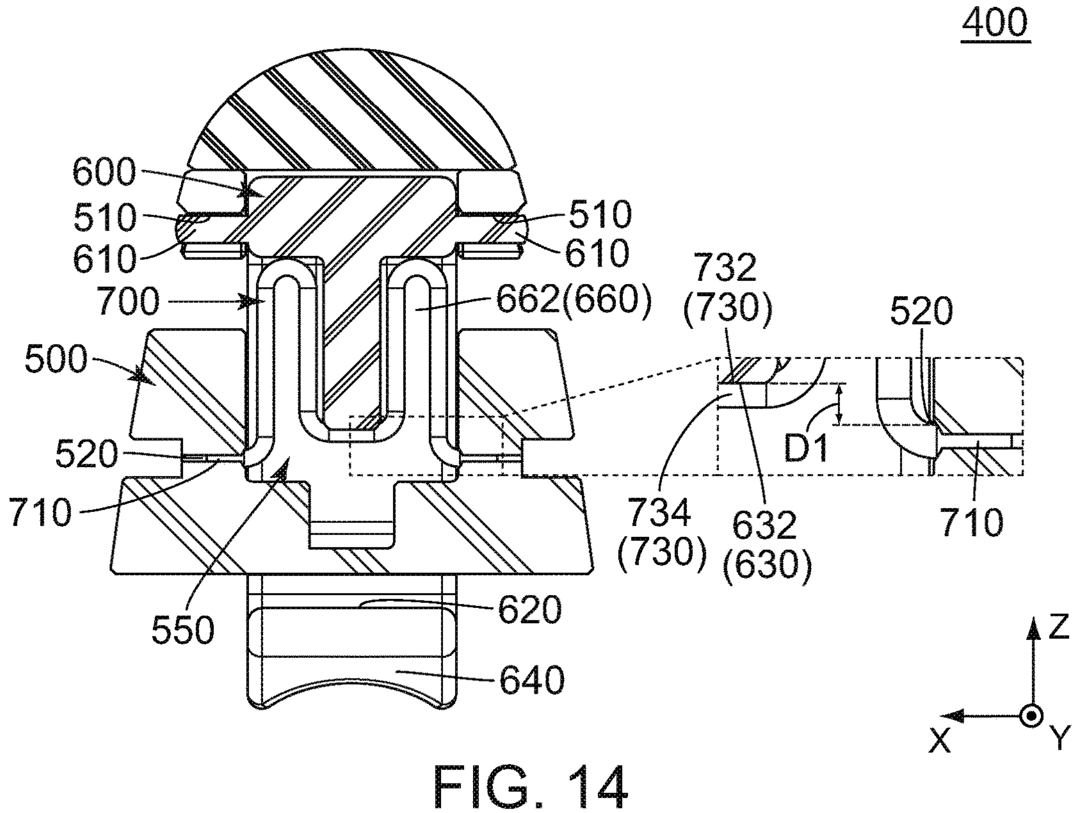
FIG. 14 is a cross-sectional view showing the second connector of FIG. 13, taken along line E-E. In the figure, a part of the second connector is enlarged and illustrated.
Figure 15:
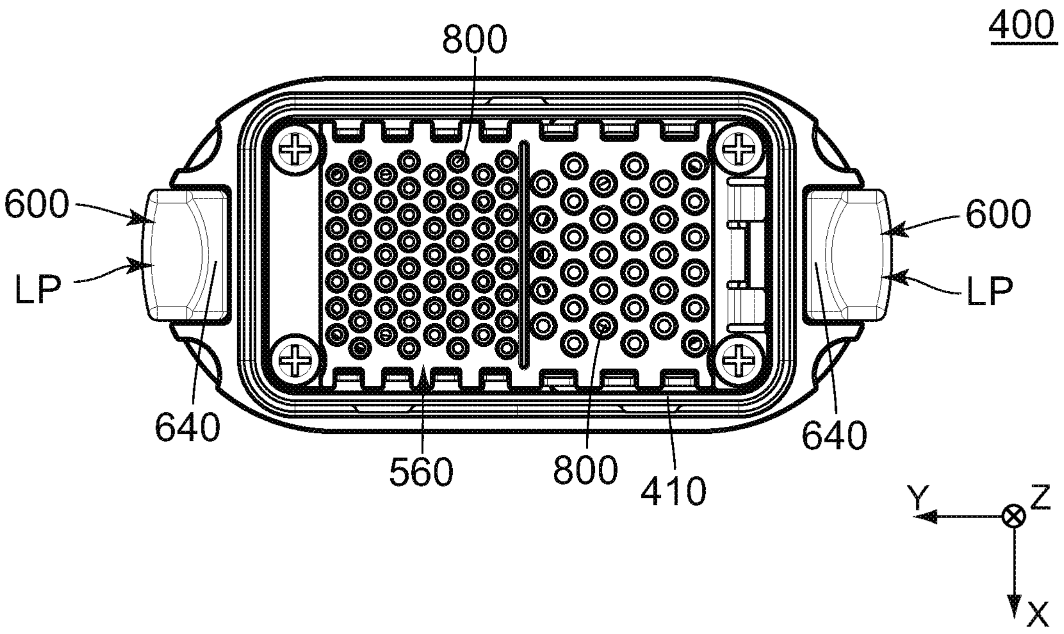
FIG. 15 is a bottom view showing the second connector of FIG. 13.
Figure 16:
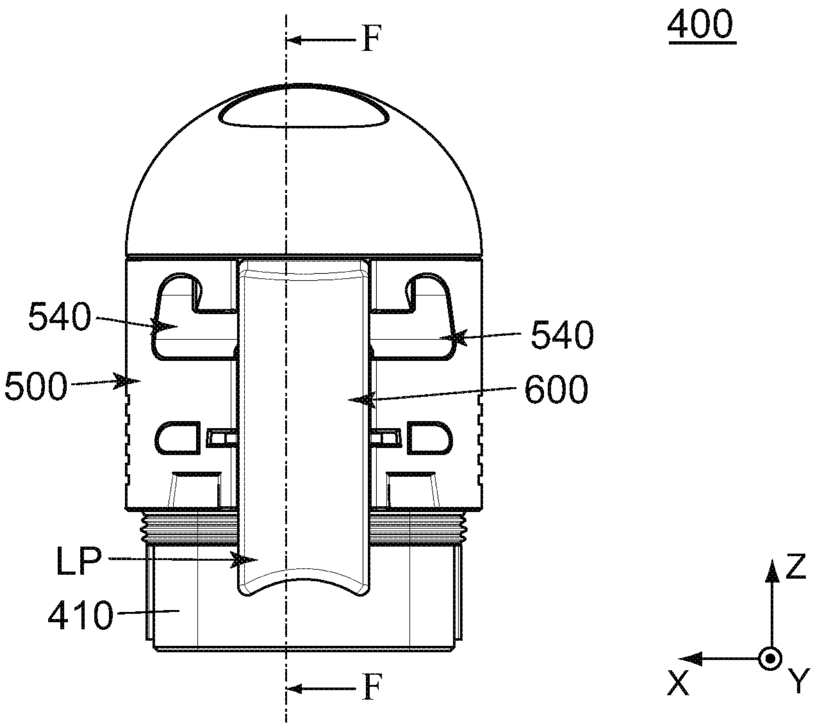
FIG. 16 is a side view showing the second connector of FIG. 13.
Figure 22:
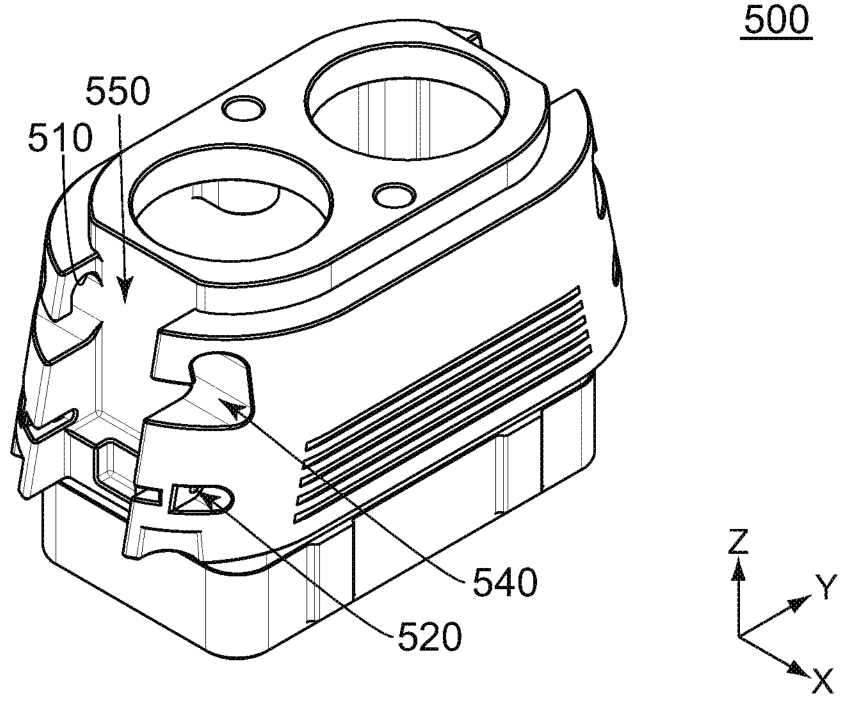
FIG. 22 is an upper, perspective view showing a part of a second housing which is included in the second connector of FIG. 13.
Figure 23:
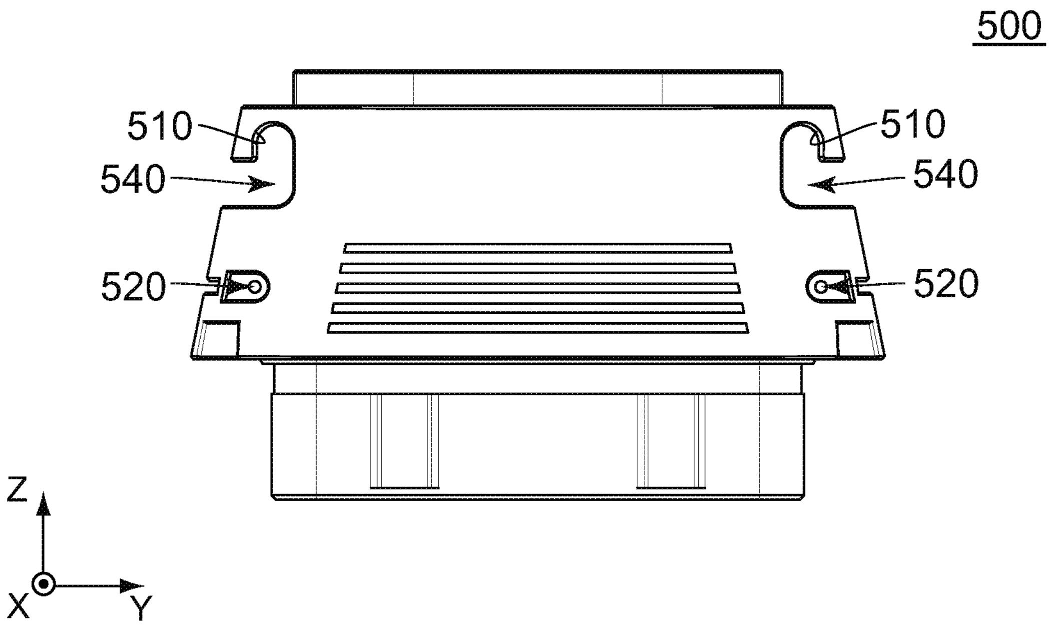
FIG. 23 is a front view showing the second housing of FIG. 22.

Referring to FIG. 22, the second housing 500 of the present embodiment is made of insulator. Referring to FIGS. 14 and 23, the second housing 500 is provided with four first axis portions 510.

Referring to FIGS. 14 and 22, each of the first axis portions 510 of the present embodiment is a bearing 510. Each of the first axis portions 510 is a hole extending in a front-rear direction perpendicular to the first direction. In the present embodiment, the front-rear direction is an X-direction. Specifically, it is assumed that forward is a positive X-direction while rearward is a negative X-direction. As shown in FIG. 23, each of the first axis portions 510 is positioned around an outer end of the second housing 500 in the width direction. The four first axis portions 510 are grouped into two pairs each consisting of two of the first axis portions 510. The two first axis portions 510 of each pair are positioned at positions same as each other in the up-down direction. The two first axis portions 510 of each pair are positioned at positions same as each other in the width direction.

Referring to FIGS. 14 and 23, the second housing 500 is further provided with four holding portions 520.

Referring to FIGS. 14 and 23, each of the holding portions 520 of the present embodiment is a hole extending in the front-rear direction perpendicular to the first direction. The four holding portions 520 are grouped into two pairs each consisting of two of the holding portions 520. The two holding portions 520 of each pair are positioned at positions same as each other in the up-down direction. The two holding portions 520 of each pair are positioned at positions same as each other in the width direction.

Figure 24:
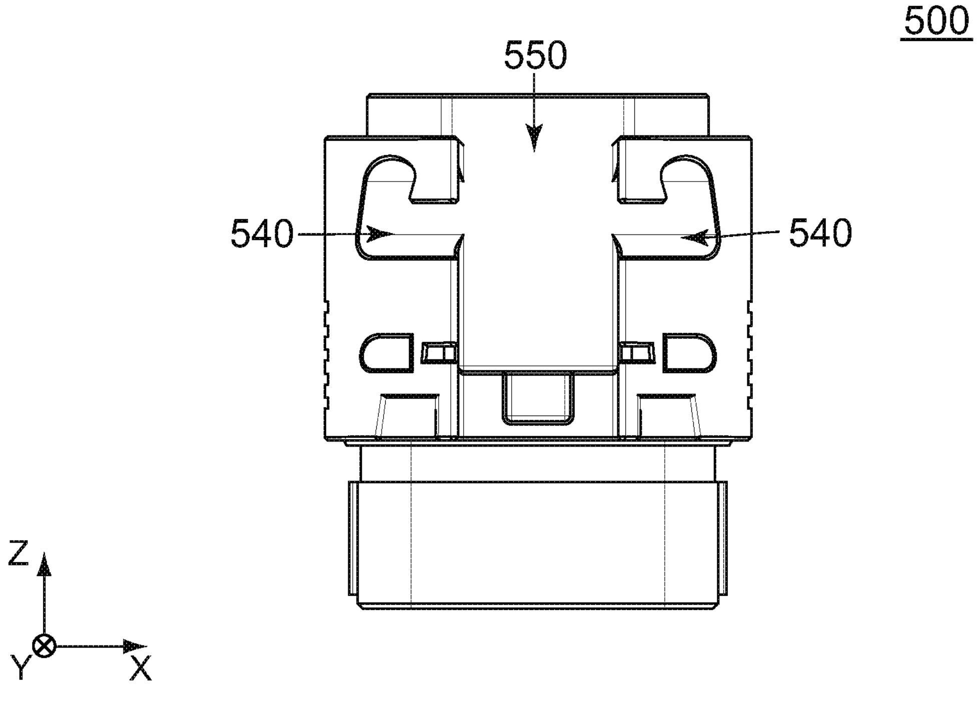
FIG. 24 is a side view showing the second housing of FIG. 22.

Referring to FIGS. 23 and 24, the second housing 500 is formed with four ditches 540. Each of the ditches 540 is a hole extending in the front-rear direction. The ditch 540 communicates with the bearing 510 and extends in the first direction. Each of the ditches 540 is positioned beyond any of the holding portions 520 in the second direction. The four ditches 540 correspond to the four bearings 510, respectively. Each of the ditches 540 communicates with the corresponding bearing 510 and extends in the first direction.

Referring to FIGS. 23 and 24, the four holding portions 520, the four first axis portions 510 and the four ditches 540 are grouped into two sets each consisting of two of the holding portions 520, two of the first axis portions 510 and two of the ditches 540. In each set, each of the holding portions 520 is positioned beyond any of the first axis portions 510 in the first direction. In each set, each of the holding portions 520 is positioned outward of any of the first axis portions 510 in the width direction. In each set, each of the ditches 540 is positioned beyond any of the first axis portions 510 in the first direction. In each set, each of the ditches 540 is positioned beyond any of the holding portions 520 in the second direction. In each set, each of the ditches 540 is positioned inward of any of the holding portions 520 in the width direction.

Figure 8:
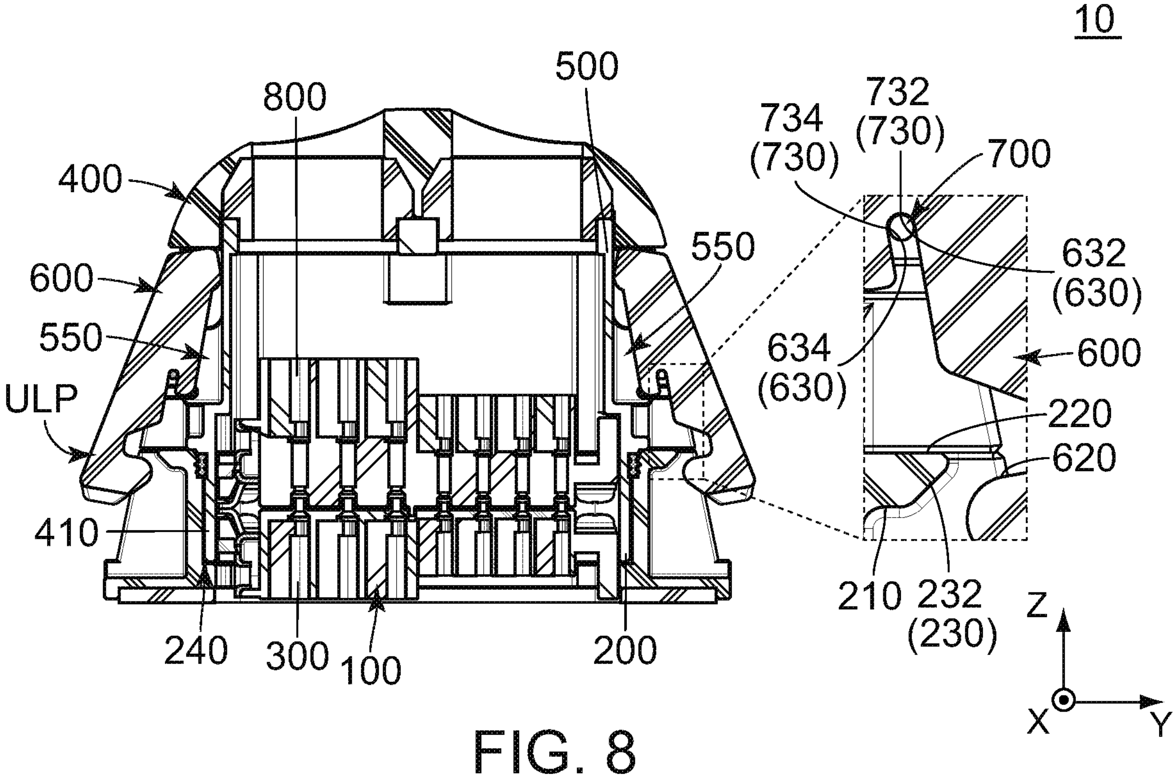
FIG. 8 is a cross-sectional view showing the connector assembly of FIG. 7. In the figure, a part of the connector assembly is illustrated and enlarged.

Referring to FIGS. 8 and 24, the second housing 500 has two lock lever accommodating portions 550.

Referring to FIGS. 8 and 24, the lock lever accommodating portions 550 of the present embodiment are positioned at opposite sides, respectively, of the second housing 500 in the width direction. Each of the lock lever accommodating portions 550 is recessed inward in the width direction. The two lock lever accommodating portions 550 correspond to the two sets, respectively, each of which consists of the two first axis portions 510, the two holding portions 520 and the two ditches 540. As shown in FIG. 14, each of the lock lever accommodating portions 550 is positioned between the two first axis portions 510 of the corresponding set in the front-rear direction. Each of the lock lever accommodating portions 550 is positioned between the two holding portions 520 of the corresponding set in the front-rear direction. As shown in FIG. 24, each of the lock lever accommodating portions 550 is positioned between the two ditches 540 of the corresponding set in the front-rear direction.

As shown in FIG. 17, the second housing 500 has a first connector accommodating portion 560.

As shown in FIG. 11, the first connector accommodating portion 560 of the present embodiment is recessed in the second direction. Referring to FIGS. 4 and 11, the first connector accommodating portion 560 accommodates a part of the first connector 100 when the first connector 100 and the second connector 400 are mated with each other.

Figure 7:
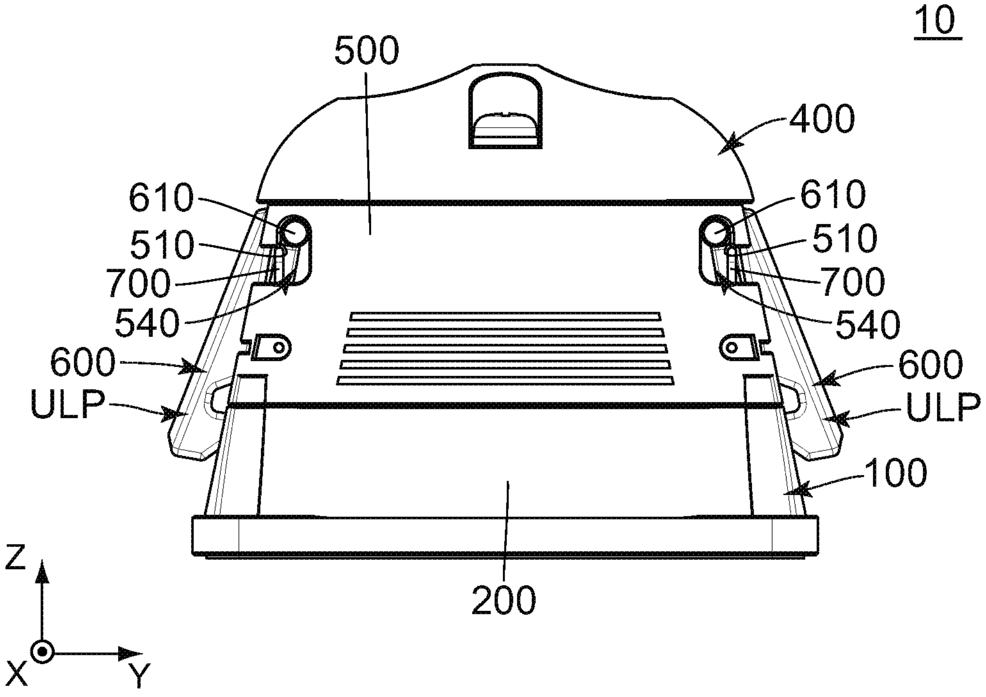
FIG. 7 is another front view showing the connector assembly of FIG. 2. In the figure, the first connector and the second connector are in the mated state, and the lock lever is positioned at an unlock position.

As understood from FIGS. 7 and 13, each of the lock levers 600 of the present embodiment is attached to the second housing 500 so as to be rotatable between a lock position LP and an unlock position ULP. The two lock levers 600 correspond to the two sets, respectively, each of which consists of the two first axis portions 510, the two holding portions 520 and the two ditches 540. The two lock levers 600 correspond to the two lock lever accommodating portions 550, respectively. As shown in FIG. 14, each of the lock levers 600 is accommodated in the corresponding lock lever accommodating portion 550.

Figure 28:
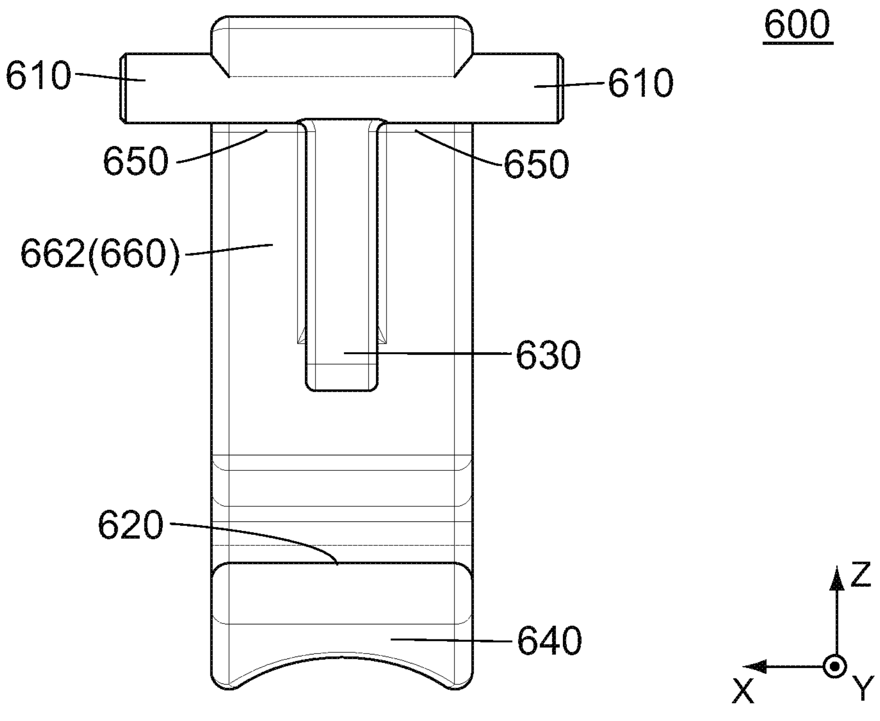
FIG. 28 is a view showing the lock lever which is included in the second connector of FIG. 13.
Figure 29:
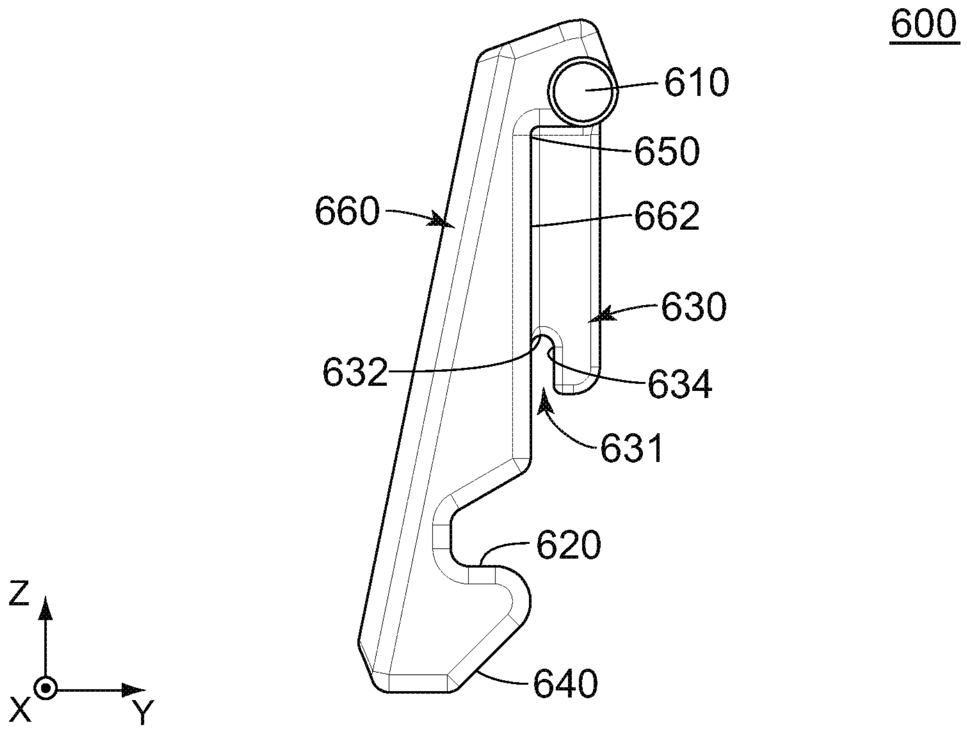
FIG. 29 is another view showing the lock lever of FIG. 28.
Figure 30:
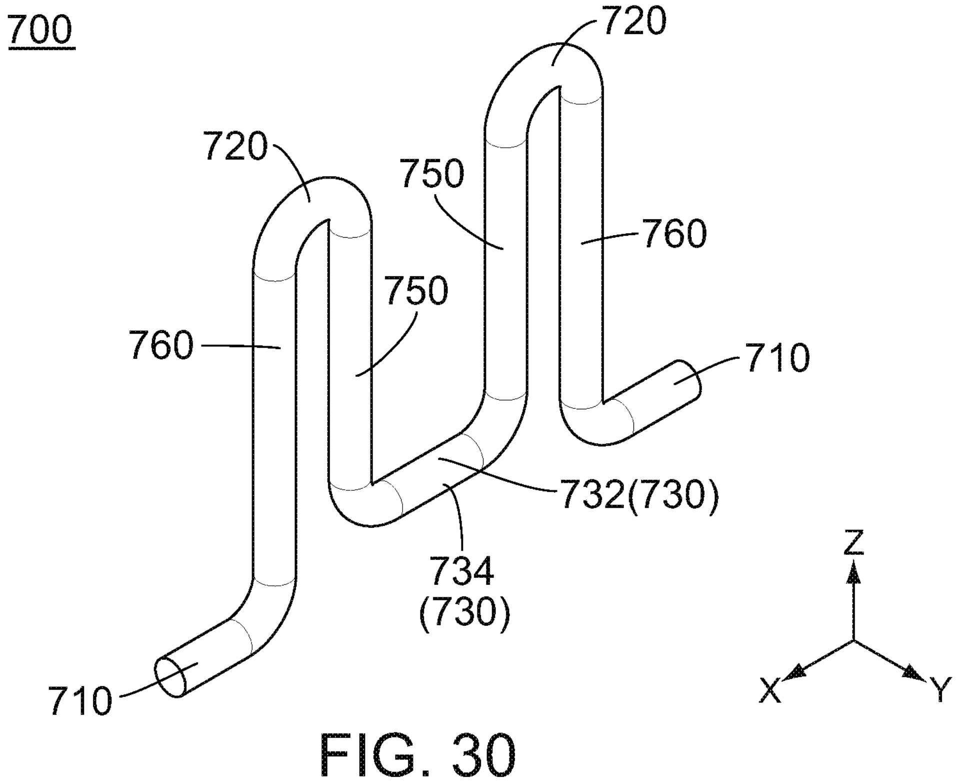
FIG. 30 is a perspective view showing the spring which is included in the second connector of FIG. 13. The spring shown in the figure is in a state prior to attachment of the spring to both the second housing and the lock lever.

As shown in FIGS. 28 and 29, each of the lock levers 600 is provided with two second axis portions 610 and an engaging portion 620.

As shown in FIG. 28, each of the second axis portions 610 of the present embodiment is a rotation axis. Each of the second axis portions 610 extends in the front-rear direction. Each of the second axis portions 610 is positioned around an end portion of the lock lever 600 in the second direction. In other words, each of the second axis portions 610 is positioned around an upper end of the lock lever 600 in the up-down direction. As shown in FIG. 14, the second axis portion 610 is combined with the first axis portion 510. Specifically, the two second axis portions 610 of the lock lever 600 are combined with the two first axis portions 510, respectively, of the corresponding set.

As shown in FIG. 29, the engaging portion 620 of the present embodiment faces in the second direction. In other words, the engaging portion 620 faces upward in the up-down direction. The engaging portion 620 is a surface intersecting with the second direction. The engaging portion 620 is positioned beyond any of the second axis portions 610 in the first direction. In other words, the engaging portion 620 is positioned below any of the second axis portions 610 in the up-down direction.

As shown in FIG. 4, the engaging portion 620 is positioned beyond the engaged portion 210 in the first direction when the lock lever 600 is positioned at the lock position LP under a mated state where the first connector 100 and the second connector 400 are mated with each other. Specifically, the engaging portion 620 locks, together with the engaged portion 210, the mating of the first connector 100 with the second connector 400 when the lock lever 600 is positioned at the lock position LP under the mated state where the first connector 100 and the second connector 400 are mated with each other.

As shown in FIG. 8, the second connector 400 is removable from the first connector 100 when the lock lever 600 is positioned at the unlock position ULP under the mated state. In other words, the engaging portion 620 and the engaged portion 210 do not lock the mating of the first connector 100 with the second connector 400 when the lock lever 600 is positioned at the unlock position ULP under the mated state.

As shown in FIG. 29, the lock lever 600 is further provided with a first pressed portion 632 and a second pressed portion 634.

As shown in FIG. 29, the first pressed portion 632 of the present embodiment faces in the first direction. In other words, the first pressed portion 632 faces downward in the up-down direction. The first pressed portion 632 is positioned beyond any of the second axis portions 610 in the first direction. In other words, the first pressed portion 632 is positioned below any of the second axis portions 610 in the up-down direction. The first pressed portion 632 is positioned outward of any of the second axis portions 610 in the width direction. The first pressed portion 632 is positioned beyond the engaging portion 620 in the second direction. In other words, the first pressed portion 632 is positioned above the engaging portion 620 in the up-down direction. The first pressed portion 632 is positioned inward of the engaging portion 620 in the width direction. The first pressed portion 632 is positioned beyond the second pressed portion 634 in the second direction. In other words, the first pressed portion 632 is positioned above the second pressed portion 634 in the up-down direction. The first pressed portion 632 is positioned outward of the second pressed portion 634 in the width direction. As shown in FIG. 14, the first pressed portion 632 is positioned beyond any of the holding portions 520 in the second direction. In other words, the first pressed portion 632 is positioned above any of the holding portions 520 in the up-down direction.

Referring to FIGS. 11 and 23, when the lock lever 600 is positioned at the lock position LP, the first pressed portion 632 of the lock lever 600 is positioned at a position same as a position of any of the holding portions 520 of the corresponding set in the width direction. Referring to FIGS. 8 and 23, when the lock lever 600 is positioned at the unlock position ULP, the first pressed portion 632 of the lock lever 600 is positioned outward of any of the holding portions 520 of the corresponding set in the width direction.

As shown in FIG. 14, the holding portion 520 and the first pressed portion 632 are positioned away from each other by a first distance D1 in the second direction when the lock lever 600 is positioned at the lock position LP. In other words, the first distance D1 is a distance between the holding portion 520 and the first pressed portion 632 in the second direction upon the lock lever 600 being positioned at the lock position LP.

As shown in FIG. 29, the second pressed portion 634 of the present embodiment faces outward in the width direction. The second pressed portion 634 is positioned beyond any of the second axis portions 610 in the first direction. In other words, the second pressed portion 634 is positioned below any of the second axis portions 610 in the up-down direction. The second pressed portion 634 is positioned outward of any of the second axis portions 610 in the width direction. The second pressed portion 634 is positioned beyond the engaging portion 620 in the second direction. In other words, the second pressed portion 634 is positioned above the engaging portion 620 in the up-down direction. The second pressed portion 634 is positioned inward of the engaging portion 620 in the width direction. The second pressed portion 634 is positioned beyond the first pressed portion 632 in the first direction. In other words, the second pressed portion 634 is positioned below the first pressed portion 632 in the up-down direction. The second pressed portion 634 is positioned inward of the first pressed portion 632 in the width direction. Referring to FIGS. 4 and 14, the second pressed portion 634 is positioned beyond any of the holding portions 520 in the second direction. In other words, the second pressed portion 634 is positioned above any of the holding portions 520 in the up-down direction.

As shown in FIG. 28, the lock lever 600 is provided with two regulating portions 650. However, the present invention is not limited thereto, but the regulating portion 650 may be provided at the second housing 500. In other words, one of the second housing 500 and the lock lever 600 should be provided with the regulating portion 650.

Figure 18:
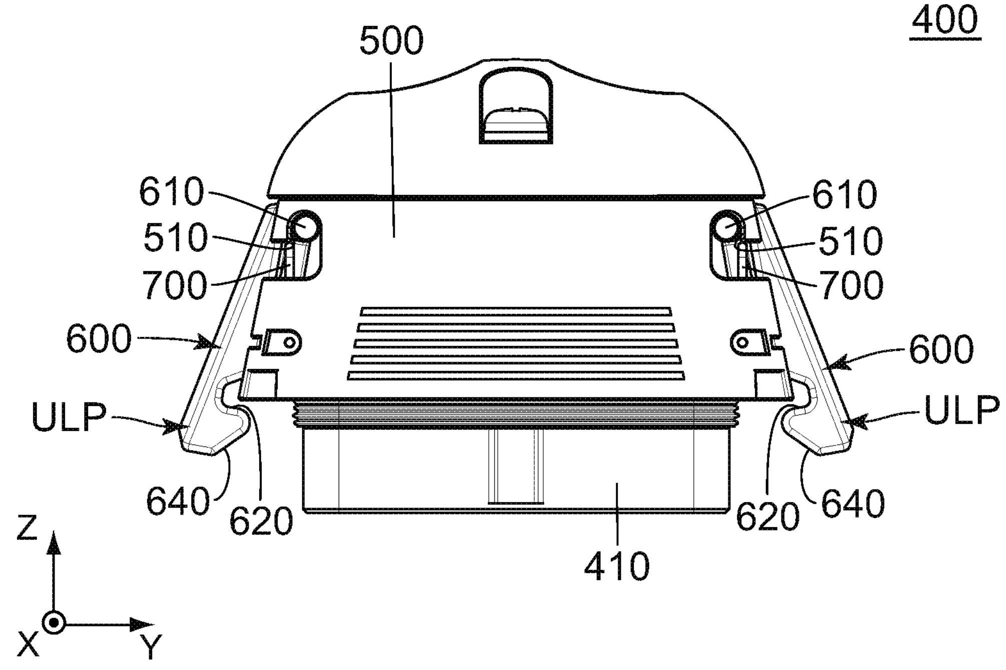
FIG. 18 is a front view showing the second connector which is included in the connector assembly of FIG. 7.
Figure 19:
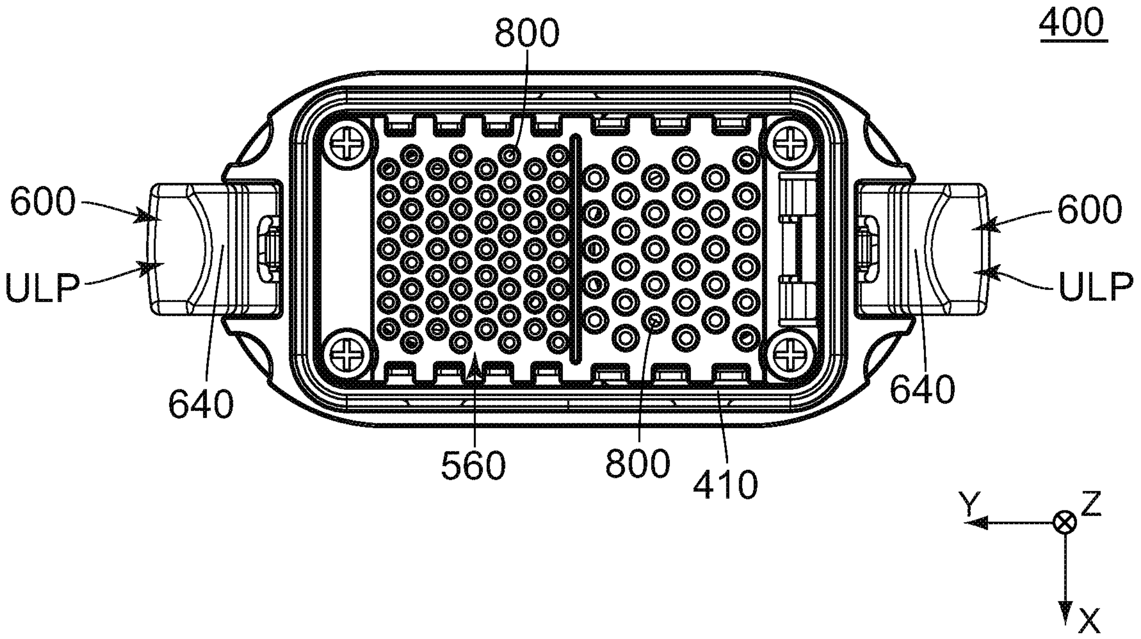
FIG. 19 is a bottom view showing the second connector of FIG. 18.
Figure 20:
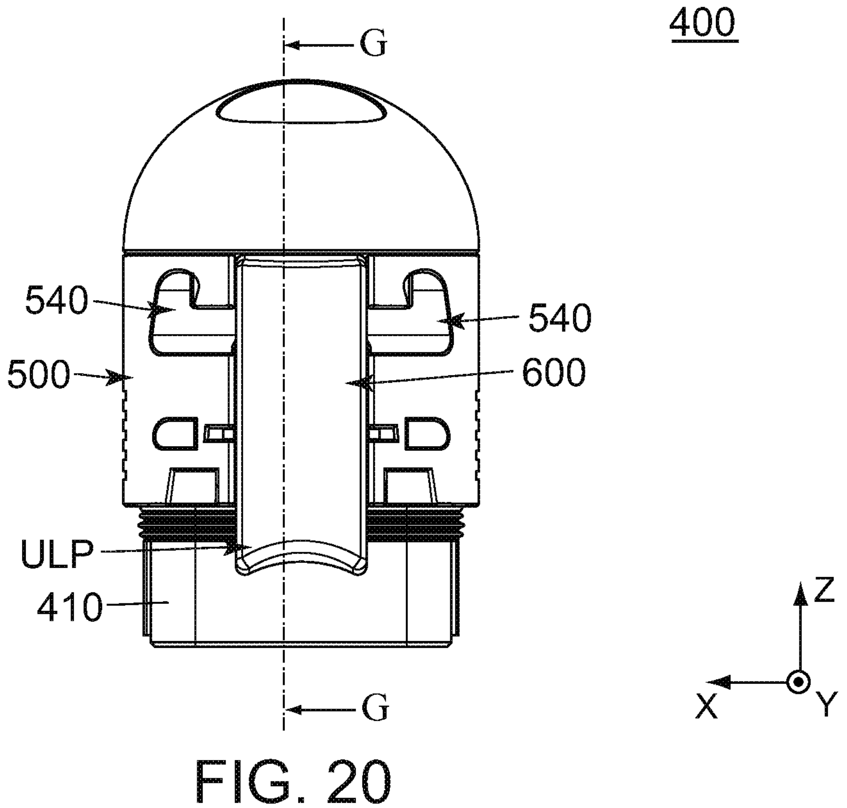
FIG. 20 is a side view showing the second connector of FIG. 18.
Figure 21:
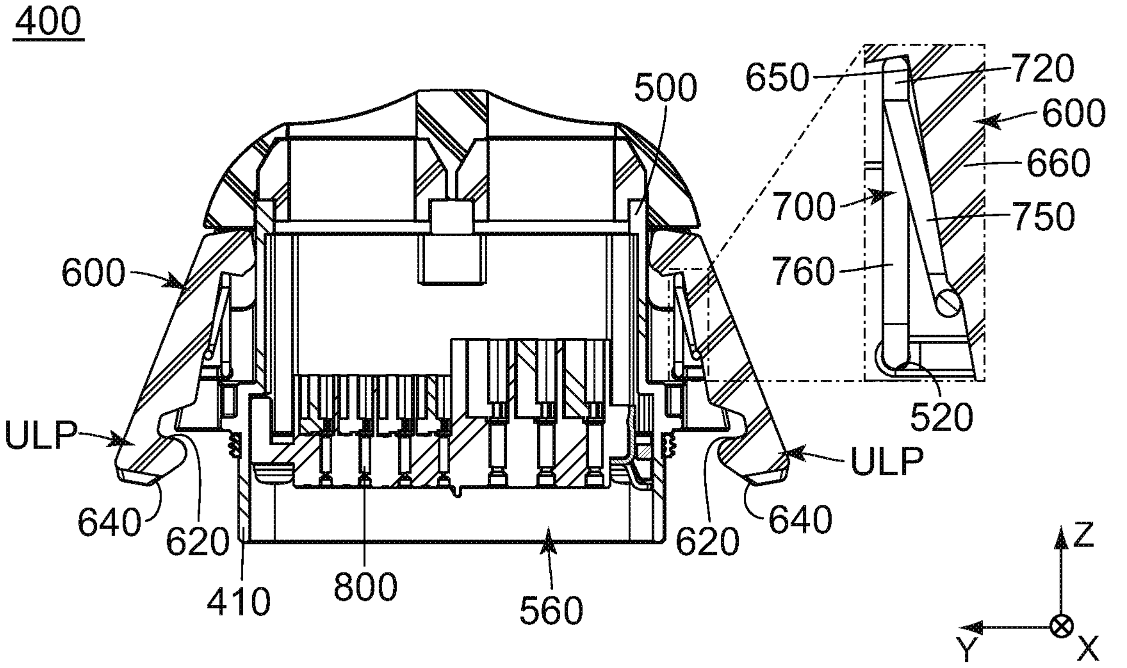
FIG. 21 is a cross-sectional view showing the second connector of FIG. 20, taken along line G-G. In the figure, a part of the second connector is enlarged and illustrated.

As shown in FIG. 29, each of the regulating portions 650 of the present embodiment is a surface facing inward in the width direction. Each of the regulating portions 650 is positioned beyond any of the second axis portions 610 in the first direction. In other words, each of the regulating portions 650 is positioned below any of the second axis portions 610 in the up-down direction. Each of the regulating portions 650 is positioned outward of any of the second axis portions 610 in the width direction. Each of the regulating portions 650 is positioned beyond the engaging portion 620 in the second direction. In other words, each of the regulating portions 650 is positioned above the engaging portion 620 in the up-down direction. Each of the regulating portions 650 is positioned inward of the engaging portion 620 in the width direction. Referring to FIGS. 18, 21 and 29, each of the regulating portions 650 of the lock lever 600 is positioned outward of any of the first axis portions 510 of the corresponding set in the width direction.

As shown in FIG. 28, the lock lever 600 is further provided with a hooked portion 630.

As shown in FIG. 28, the hooked portion 630 of the present embodiment is positioned at a middle of the lock lever 600 in the front-rear direction. The hooked portion 630 is positioned between the two second axis portions 610 in the front-rear direction. The hooked portion 630 is positioned around a middle of the lock lever 600 in the up-down direction. As shown in FIG. 29, the hooked portion 630 is positioned beyond any of the second axis portions 610 in the first direction. In other words, the hooked portion 630 is positioned below any of the second axis portions 610 in the up-down direction. The hooked portion 630 is positioned beyond the engaging portion 620 in the second direction. In other words, the hooked portion 630 is positioned above the engaging portion 620 in the up-down direction. The hooked portion 630 has a recessed portion 631. The recessed portion 631 is recessed in the second direction. In other words, the recessed portion 631 is recessed upward in the up-down direction. The recessed portion 631 communicates with the outside of the hooked portion 630 in the front-rear direction. Each of the first pressed portion 632 and the second pressed portion 634 is provided on the hooked portion 630. More specifically, a surface, which faces in the first direction, of the recessed portion 631 of the hooked portion 630 functions as the first pressed portion 632, and a surface, which faces outward in the width direction, of the recessed portion 631 of the hooked portion 630 functions as the second pressed portion 634.

Although the hooked portion 630 of the present embodiment has the recessed portion 631, the present invention is not limited thereto. Specifically, the hooked portion 630 may have, instead of the recessed portion 631, a hole which pierces the hooked portion 630 in the front-rear direction. In this case, an inner surface, which faces in the first direction, of the hole of the hooked portion 630 functions as the first pressed portion 632, and an inner surface, which faces outward in the width direction, of the hole of the hooked portion 630 functions as the second pressed portion 634.

As shown in FIG. 29, the lock lever 600 is further provided with a first abutment portion 640. Specifically, the connector assembly 10 of the present embodiment has two sets each consisting of the lock lever 600, the engaging portion 620, the first abutment portion 640, the spring 700, the engaged portion 210 and the second abutment portion 220. However, the present invention is not limited thereto, but the connector assembly 10 should have a single set of the lock lever 600, the engaging portion 620, the first abutment portion 640, the spring 700, the engaged portion 210 and the second abutment portion 220.

As shown in FIG. 29, the first abutment portion 640 of the present embodiment is positioned beyond the engaging portion 620 in the first direction. In other words, the first abutment portion 640 is positioned below the engaging portion 620 in the up-down direction. The first abutment portion 640 is positioned at an end portion of the lock lever 600 in the first direction. In other words, the first abutment portion 640 is positioned at a lower end of the lock lever 600 in the up-down direction. The first abutment portion 640 is an inclined surface oblique to the first direction. Specifically, the first abutment portion 640 faces in the first direction and inward in the width direction. In other words, the first abutment portion 640 faces downward in the up-down direction and inward in the width direction.

Although the connector assembly 10 of the present embodiment is configured so that the second abutment portion 220 is the plane perpendicular to the second direction, while the first abutment portion 640 is the inclined surface oblique to the first direction, the present invention is not limited thereto. Specifically, the connector assembly 10 may be configured so that the second abutment portion 220 is an inclined surface oblique to the first direction, while the first abutment portion 640 is a plane perpendicular to the second direction. In other words, at least one of the first abutment portion 640 and the second abutment portion 220 should be an inclined surface which is oblique to the first direction;

As shown in FIG. 29, the lock lever 600 further has a main portion 660.

As shown in FIG. 29, the main portion 660 of the present embodiment defines an outer end of the lock lever 600 in the width direction. The main portion 660 has an inner surface 662. The inner surface 662 faces inward in the width direction. The inner surface 662 is positioned outward of any of the second axis portions 610 in the width direction. The inner surface 662 is positioned outward of the hooked portion 630 in the width direction. The hooked portion 630 protrudes inward in the width direction from the main portion 660. As shown in FIG. 28, each of the regulating portions 650 is provided on the main portion 660. More specifically, each of the regulating portions 650 is a part of the inner surface 662 of the main portion 660.

Figure 31:
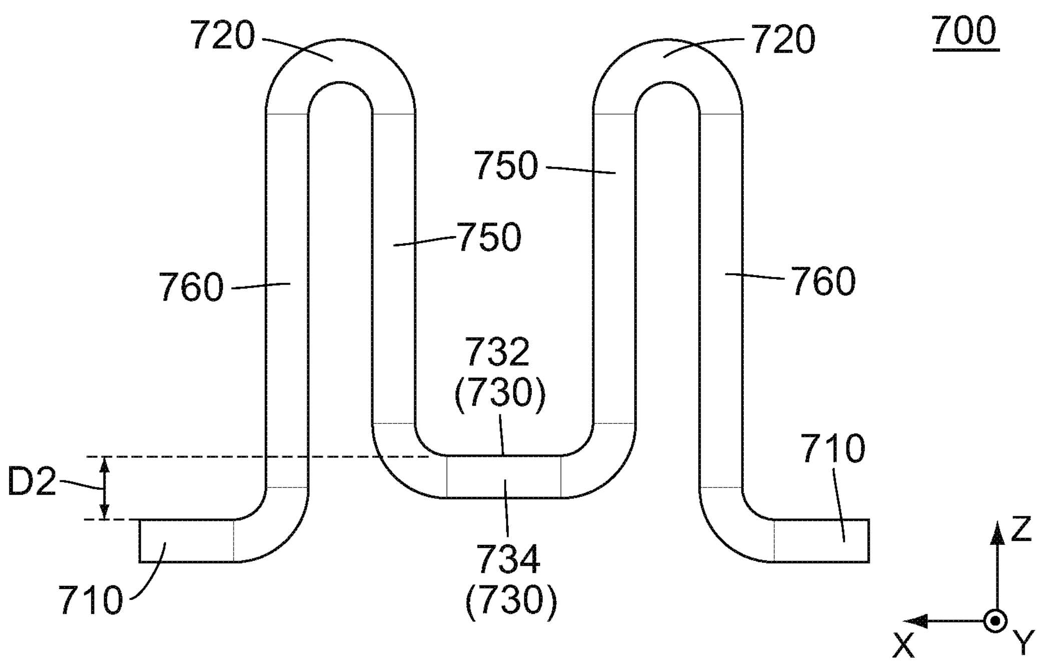
FIG. 31 is a view showing the spring of FIG. 30.
Figure 32:
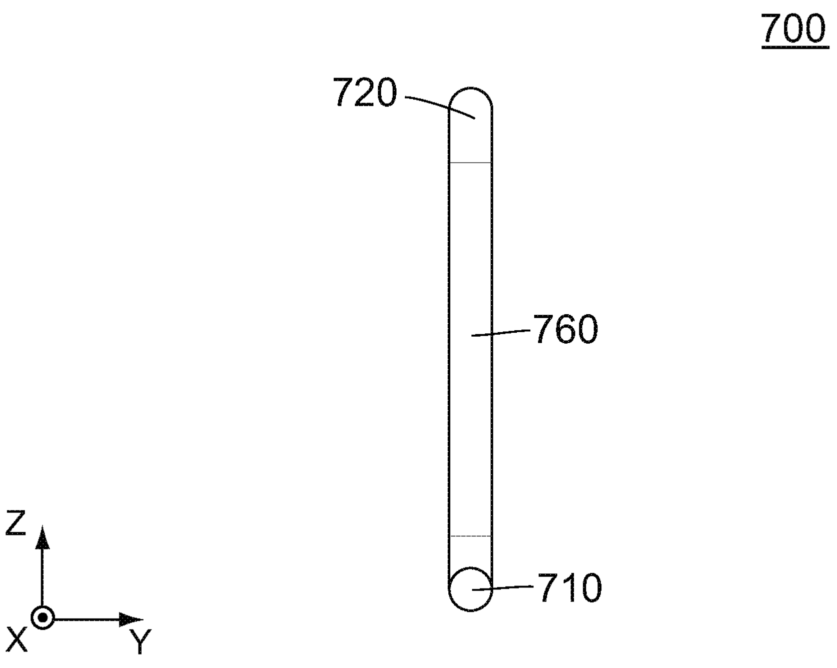
FIG. 32 is another view showing the spring of FIG. 30.

Referring to FIG. 31, the spring 700 of the present embodiment is made of metal. The spring 700 is formed by bending a round metal rod. As shown in FIG. 14, the spring 700 is attached to both the second housing 500 and the lock lever 600.

Referring to FIGS. 11, 14 and 21, the spring 700 urges the lock lever 600 to be moved toward the lock position LP, and the spring 700 urges the second axis portions 610 to be moved in the second direction when the lock lever 600 is positioned at the lock position LP. In other words, the spring 700 urges the lock lever 600 to be moved toward the lock position LP, and the spring 700 urges the second axis portions 610 to be moved upward in the up-down direction when the lock lever 600 is positioned at the lock position LP.

As described above, the connector assembly 10 of the present embodiment is configured as follows: the engaging portion 620 of the lock lever 600 is positioned beyond the engaged portion 210 of the first housing 200 in the first direction when the lock lever 600 is positioned at the lock position LP under the mated state where the first connector 100 and the second connector 400 are mated with each other; the spring 700 is attached to both the second housing 500 and the lock lever 600; the spring 700 urges the lock lever 600 to be moved toward the lock position LP; and, when the lock lever 600 is positioned at the lock position LP, the spring 700 urges the second axis portions 610 to be moved in the second direction. Accordingly, when the lock lever 600 is positioned at the lock position LP under the mated state where the first connector 100 and the second connector 400 are mated with each other, the engaging portion 620 of the lock lever 600 is pressed against the engaged portion 210 of the first housing 200 of the first connector 100 and thereby both components of the first connector 100 and the second connector 400 are prevented from being unstable. Specifically, the connector assembly 10 of the present embodiment prevents the both components of the first connector 100 and the second connector 400, which are mated with each other, from being unstable when the connector assembly 10 is used in a high vibration environment.

As shown in FIG. 31, the spring 700 has a substantially M-shape when the spring 700 is viewed alone in the width direction. The spring 700 has two held portions 710, two regulated portions 720, a first pressing portion 732, a second pressing portion 734 and two arm portions 750. However, the present invention is not limited thereto, but the number of each of the held portion 710, the regulated portion 720 and the arm portion 750 may be one. In other words, the spring 700 should have the single held portion 710, the single regulated portion 720, the first pressing portion 732, the second pressing portion 734 and the single arm portion 750.

Figure 26:
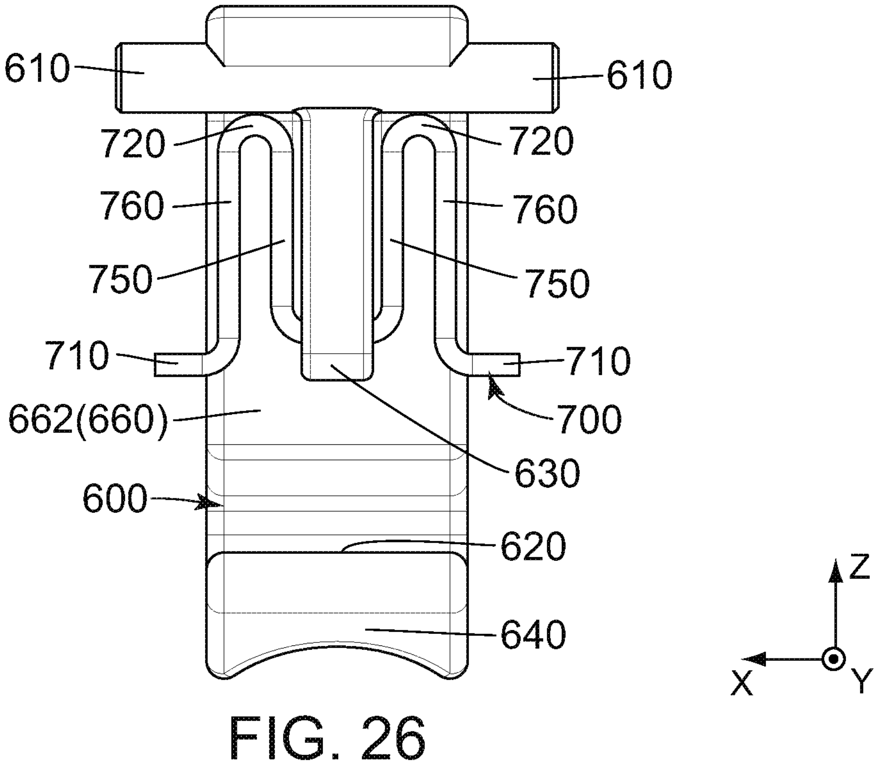
FIG. 26 is a view showing the lock lever and the spring of FIG. 25.
Figure 27:
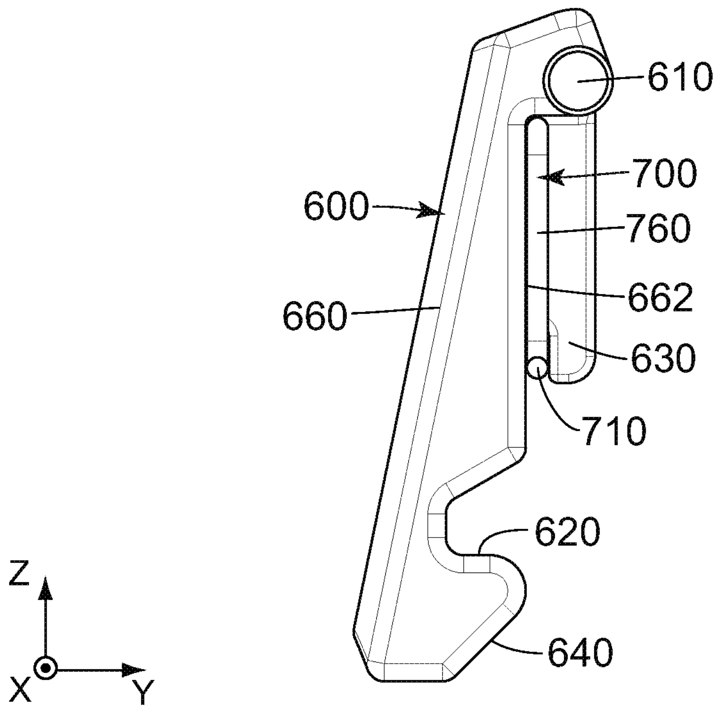
FIG. 27 is another view showing the lock lever and the spring of FIG. 25.

As shown in FIG. 31 the held portions 710 of the present embodiment define opposite ends, respectively, of the spring 700 in the front-rear direction. As shown in FIG. 14, the held portion 710 is held by the holding portion 520. As shown in FIG. 26, the hooked portion 630 is positioned between the two held portions 710 in the front-rear direction.

As shown in FIG. 31, each of the regulated portions 720 of the present embodiment is positioned at an end portion of the spring 700 in the second direction. In other words, each of the regulated portions 720 of the present embodiment is positioned at an upper end of the spring 700 in the up-down direction. Referring to FIGS. 17 and 21, at least when the lock lever 600 is moved from the lock position LP toward the unlock position ULP, a movement of the regulated portion 720 is regulated by the regulating portion 650. As shown in FIG. 26, the hooked portion 630 is positioned between the two regulated portions 720 in the front-rear direction.

Although the regulating portion 650 of the present embodiment is the surface, which faces inward in the width direction, and regulates the movement of the regulated portion 720 at least when the lock lever 600 is moved from the lock position LP toward the unlock position ULP, the present invention is not limited thereto. Specifically, the regulating portion 650 may have any structure, provided that the regulating portion 650 regulates the movement of the regulated portion 720 at least when the lock lever 600 is moved from the lock position LP toward the unlock position ULP. More specifically, the regulating portion 650 may be, for example, a recess which is recessed in the second direction, or upward in the up-down direction, and which, at least in part, accommodates the regulated portion 720.

As shown in FIG. 31, the first pressing portion 732 of the present embodiment faces in the second direction. In other words, the first pressing portion 732 faces upward in the up-down direction. The first pressing portion 732 is positioned at a middle of the spring 700 in the front-rear direction. The first pressing portion 732 is positioned beyond any of the regulated portions 720 in the first direction. In other words, the first pressing portion 732 is positioned below any of the regulated portions 720 in the up-down direction. The first pressing portion 732 is positioned beyond any of the held portions 710 in the second direction. In other words, the first pressing portion 732 is positioned above any of the held portions 710 in the up-down direction. When the spring 700 is viewed alone, the held portion 710 and the first pressing portion 732 are positioned away from each other by a second distance D2 in the second direction. In other words, the second distance D2 is a distance between the held portion 710 and the first pressing portion 732 in the second direction upon the spring 700 being viewed alone.

As shown in FIGS. 13 and 14, each of the held portions 710 is positioned beyond the first pressing portion 732 in the first direction when the lock lever 600 is positioned at the lock position LP. In other words, each of the held portions 710 is positioned below the first pressing portion 732 in the up-down direction when the lock lever 600 is positioned at the lock position LP.

Referring to FIG. 14, when the lock lever 600 is positioned at the lock position LP, the first pressing portion 732 is positioned beyond the first pressed portion 632 in the first direction while the first pressing portion 732 presses the first pressed portion 632 in the second direction. In other words, when the lock lever 600 is positioned at the lock position LP, the first pressing portion 732 is positioned below the first pressed portion 632 in the up-down direction while the first pressing portion 732 presses the first pressed portion 632 upward in the up-down direction.

Referring to FIGS. 14 and 31, in the second connector 400 of the present embodiment, the first distance D1 is shorter than the second distance D2. Specifically, in the second connector 400 of the present embodiment which is configured so that the held portion 710 is positioned beyond the first pressing portion 732 in the first direction when the lock lever 600 is positioned at the lock position LP, the first distance D1 is shorter than the second distance D2. Accordingly, when the spring 700 is attached to both the second housing 500 and the lock lever 600, the first pressed portion 632 of the lock lever 600 presses the first pressing portion 732 of the spring 700 in the first direction, or downward in the up-down direction, and thereby the spring 700 is resiliently deformed to have a restoring force. Then, the restoring force generated by the resilient deformation of the spring 700 causes the first pressing portion 732 of the spring 700 to apply a force, which urges the first pressed portion 632 of the lock lever 600 to be moved in the second direction, or upward in the up-down direction, to the first pressed portion 632 of the lock lever 600.

Referring to FIG. 13, in a natural state, the lock lever 600 of the second connector 400 is configured to be positioned at the lock position LP. When an operator pulls the first directional end portion, or the lower end in the up-down direction, of the lock lever 600 in its natural state, the spring 700 is resiliently deformed to have a restoring force, while the second axis portion 610 is moved from the first axis portion 510 into the ditch 540 so that the lock lever 600 is slightly moved relative to the second housing 500 in the first direction, or downward in the up-down direction. When the operator stops the pulling of its end portion, the restoring force generated by the resilient deformation of the spring 700 moves the second axis portion 610 from the ditch 540 into the first axis portion 510 and moves the lock lever 600 in the second direction, or upward in the up-down direction, so that the lock lever 600 returns to its initial position.

As shown in FIG. 31, the second pressing portion 734 of the present embodiment is positioned at the middle of the spring 700 in the front-rear direction. The second pressing portion 734 is positioned beyond any of the regulated portions 720 in the first direction. In other words, the second pressing portion 734 is positioned below any of the regulated portions 720 in the up-down direction. The second pressing portion 734 is positioned beyond any of the held portions 710 in the second direction. In other words, the second pressing portion 734 is positioned above any of the held portions 710 in the up-down direction. As shown in FIG. 11, the second pressing portion 734 faces inward in the width direction. The second pressing portion 734 neighbors to the second pressed portion 634 in a direction perpendicular to the first direction. Specifically, the second pressing portion 734 neighbors to the second pressed portion 634 in the width direction perpendicular to the first direction. The second pressing portion 734 is positioned outward of the second pressed portion 634 in the width direction.

As shown in FIG. 31, the arm portions 750 of the present embodiment extend in the first direction from the regulated portions 720, respectively. In other words, each of the arm portions 750 extends downward in the up-down direction from the corresponding regulated portion 720. The arm portions 750 extend in the second direction from the second pressing portion 734. In other words, each of the arm portions 750 extends upward in the up-down direction from the second pressing portion 734. The arm portion 750 couples the second pressing portion 734 and the regulated portion 720 with each other. As shown in FIG. 26, the hooked portion 630 is positioned between the two arm portions 750 in the front-rear direction.

Referring to FIGS. 8, 11, 17 and 21, when the lock lever 600 is moved from the lock position LP toward the unlock position ULP, the second pressing portion 734 is moved together with the second pressed portion 634 and mainly the arm portions 750 are resiliently deformed so that each of the arm portions 750 has a restoring force. The restoring force generated by the resilient deformation of each of the arm portions 750 causes the second pressing portion 734 to press the second pressed portion 634 and to move the lock lever 600 toward the lock position LP.

As shown in FIG. 31, the spring 700 further has a pressing section 730.

Figure 25:
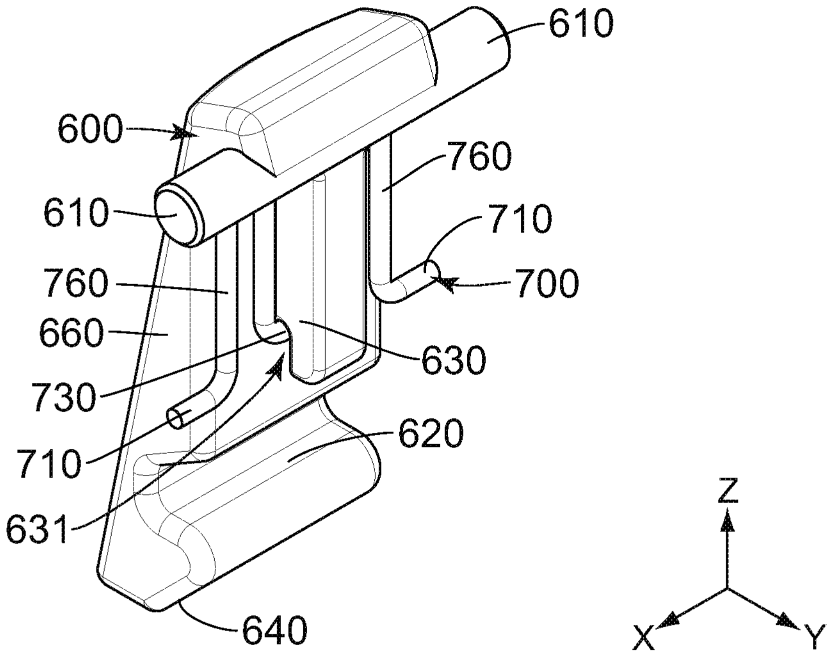
FIG. 25 is a perspective view showing the lock lever and a spring which are included in the second connector of FIG. 13.

As shown in FIG. 31, the pressing section 730 of the present embodiment is positioned at the middle of the spring 700 in the front-rear direction. The pressing section 730 is positioned beyond any of the regulated portions 720 in the first direction. In other words, the pressing section 730 is positioned below any of the regulated portions 720 in the up-down direction. The pressing section 730 is positioned beyond any of the held portions 710 in the second direction. In other words, the pressing section 730 is positioned above any of the held portions 710 in the up-down direction. Each of the first pressing portion 732 and the second pressing portion 734 is a part of the pressing section 730. As shown in FIG. 25, the pressing section 730 is hooked on the hooked portion 630. Specifically, the pressing section 730 is hooked on the recessed portion 631 of the hooked portion 630.

As described above, the connector assembly 10 of the present embodiment is configured as follows: the hooked portion 630 has the recessed portion 631 which is recessed in the second direction; the spring 700 has the substantially M-shape when the spring 700 is viewed alone in the width direction; and the pressing section 730 of the spring 700 is hooked on the recessed portion 631 of the hooked portion 630. Accordingly, the spring 700 is easily attached to the lock lever 600 upon assembly of the second connector 400 of the present embodiment.

As shown in FIG. 31, the spring 700 further has two coupling portions 760.

As shown in FIG. 31, the coupling portions 760 of the present embodiment extend in the first direction from the regulated portions 720, respectively. In other words, each of the coupling portions 760 extends downward in the up-down direction from the corresponding regulated portion 720. The coupling portions 760 extend in the second direction from the held portions 710, respectively. In other words, each of the coupling portions 760 extends upward in the up-down direction from the corresponding held portion 710. The coupling portion 760 couples the regulated portion 720 and the held portion 710 with each other. As shown in FIG. 26, the hooked portion 630 is positioned between the two coupling portions 760 in the front-rear direction.

Referring to FIG. 11, each of the second contacts 800 of the present embodiment is made of metal. As shown in FIG. 4, the second contacts 800 of the second connector 400 are connected with the first contacts 300, respectively, of the first connector 100 under the mated state where the first connector 100 and the second connector 400 are mated with each other.

(Mating Operation)

Hereinafter, a detailed description will be made about an operation of mating the first connector 100 with the second connector 400.

First, referring to FIGS. 9 and 11, the second connector 400 is arranged beyond the first connector 100 in the second direction, or above the first connector 100 in the up-down direction. From this state, the second connector 400 is moved relative to the first connector 100 in the first direction, or downward in the up-down direction. Then, a part of the mating portion 410 of the second connector 400 is accommodated in the mating portion accommodating portion 240 of the first connector 100 while the first abutment portion 640 of the lock lever 600 of the second connector 400 abuts against the second abutment portion 220 of the first connector 100.

From this state, the second connector 400 is further moved in the first direction relative to the first connector 100. Then, the first abutment portion 640, which is the inclined surface oblique to the first direction, receives an outward force in the width direction from the second abutment portion 220, and the lock lever 600 is moved from the lock position LP to the unlock position ULP. Meanwhile, the second pressing portion 734 is moved together with the second pressed portion 634 and mainly the arm portions 750 are resiliently deformed so that each of the arm portions 750 has the restoring force, and the second axis portion 610 is slightly moved from the bearing 510 into the ditch 540 against the spring 700.

After that, the second connector 400 is further moved in the first direction relative to the first connector 100. Then, the first abutment portion 640 rides over the second abutment portion 220 to be moved beyond the second abutment portion 220 in the first direction, and the engaging portion 620 is moved beyond the engaged portion 210 in the first direction. Meanwhile, the second axis portion 610, which has already been moved into the ditch 540, receives, from the spring 700, a force which is directed in the second direction, or upward in the up-down direction. Also meanwhile, the restoring force generated by the resilient deformation of each of the arm portions 750 causes the second pressing portion 734 to press the second pressed portion 634 and to move the lock lever 600 from the unlock position ULP to the lock position LP. Thus, the connector assembly 10 changes its state into a state shown in FIG. 4 where the first connector 100 and the second connector 400 are mated with each other while the mated state of the first connector 100 with the second connector 400 is locked. In this state, the lock lever 600 is positioned at the lock position LP, and the second contacts 800 are connected with the first contacts 300, respectively. Also, in this state, the engaging portion 620 is pressed against the engaged portion 210 in the second direction, or upward in the up-down direction.

The above operation is summarized as follows: when the first connector 100 and the second connector 400 are mated with each other, the first abutment portion 640, which is the inclined surface oblique to the first direction, abuts against the second abutment portion 220 and the lock lever 600 is temporarily moved from the lock position LP to the unlock position ULP; and, when the first abutment portion 640 rides over the second abutment portion 220, the engaging portion 620 is moved beyond the engaged portion 210 in the first direction.

As described above, the connector assembly 10 of the present embodiment is configured so that the first abutment portion 640 is the inclined surface oblique to the first direction. Accordingly, in the connector assembly 10 of the present embodiment, each of the lock levers 600 is temporarily and automatically moved from the lock position LP to the unlock position ULP by simply moving the second connector 400 in the first direction relative to the first connector 100 upon the mating of the first connector 100 with the second connector 400. In other words, the operator does not need to operate the lock levers 600 upon the mating of the first connector 100 with the second connector 400.

As described above, upon the mating of the first connector 100 with the second connector 400, the second axis portion 610 is not only received in the bearing 510 but is also movable into the ditch 540 which communicates with the bearing 510. Accordingly, when the lock lever 600 is moved from the lock position LP to the unlock position ULP, the lock lever 600 can be temporarily moved in the first direction, or downward in the up-down direction, while the spring 700 can be temporarily further resiliently deformed. Thus, the connector assembly 10 of the present embodiment is configured so that the restoring force generated by the resilient deformation of the spring 700 can more strongly press the engaging portion 620 against the engaged portion 210 in the second direction, or upward in the up-down direction, upon completion of the mating of the first connector 100 with the second connector 400.

(Operation of Releasing the Mating)

Hereinafter, a detailed description will be made about an operation of releasing the mating of the first connector 100 with the second connector 400.

First, in the connector assembly 10 under the state shown in FIG. 4, the operator pulls the first directional end portion of the lock lever 600 of the second connector 400 outward in the width direction. Then, the second pressing portion 734 is moved together with the second pressed portion 634 and mainly the arm portions 750 are resiliently deformed, and thereby the engaging portion 620 of the lock lever 600 is brought into contact with the surface 232, which neighbors to the engaged portion 210 in the width direction, of the intersecting portion 230.

From this state, the operator slightly pulls the first directional end portion of the lock lever 600 outward in the width direction. Then, mainly the arm portions 750 are further resiliently deformed, and the engaging portion 620 of the lock lever 600 is moved outward in the width direction, and thereby the lock lever 600 is moved to the unlock position ULP. Thus, the connector assembly 10 changes its state into a state shown in FIG. 8 where the lock of the mating of the first connector 100 with the second connector 400 is released.

As described above, the first connector 100 of the present embodiment has the intersecting portion 230 which neighbors to the engaged portion 210 in the width direction and whose surface 232 intersects with the second direction. Thus, in the connector assembly 10 of the present embodiment, the lock of the mating of the first connector 100 with the second connector 400 can be easily released by slightly pulling the first directional end portion of the lock lever 600 outward in the width direction.

Finally, in the connector assembly 10 under the state shown in FIG. 8, the second connector 400 is moved relative to the first connector 100 in the second direction, or upward in the up-down direction. Then, the mating of the first connector 100 with the second connector 400 is released. When the operator removes his/her hand from the lock levers 600 in this state, each of the lock levers 600 is moved from the unlock position ULP to the lock position LP by the restoring force generated by the resilient deformation of each of the arm portions 750 of the spring 700. Thus, the connector assembly 10 changes its state into a state shown in FIG. 9, and the operation of releasing the mating of the first connector 100 with the second connector 400 is completed

Second Embodiment

Figure 36:
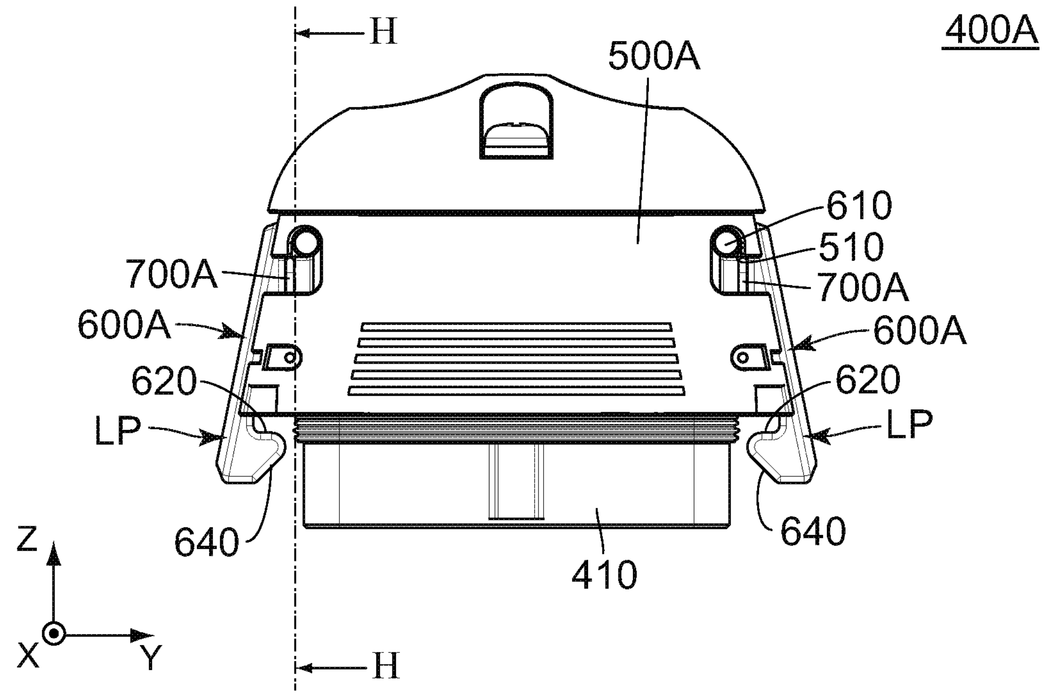
FIG. 36 is a front view showing a second connector which is included in a connector assembly according to a second embodiment of the present invention.

Referring to FIG. 36, a connector assembly (not shown) according to a second embodiment of the present invention comprises a first connector (not shown) and a second connector 400A. The first connector of the present embodiment has a structure same as that of the first connector 100 of the aforementioned first embodiment. Accordingly, a detailed explanation thereabout is omitted. As for directions and orientations in the present embodiment, expressions same as those of the first embodiment will be used hereinbelow.

Referring to FIG. 36, the second connector 400A of the present embodiment is mateable with the first connector along the first direction and is removable from the first connector along the second direction opposite to the first direction. As shown in FIG. 36, the second connector 400A has a mating portion 410. The mating portion 410 of the present embodiment has a structure same as that of the mating portion 410 of the aforementioned first embodiment. Accordingly, a detailed explanation thereabout is omitted.

Referring to FIG. 36, the second connector 400A comprises a second housing 500A, two lock levers 600A, two springs 700A and a plurality of second contacts (not shown). The second contact of the present embodiment has a structure same as that of the second contact 800 of the aforementioned first embodiment. Accordingly, a detailed explanation thereabout is omitted. The second housing 500A of the present embodiment has a structure similar to that of the second housing 500 of the aforementioned first embodiment. Accordingly, components of the second housing 500A shown in FIGS. 36 and 37 which are same as those of the second housing 500 of the first embodiment are referred by using reference signs same as those of the second housing 500 of the first embodiment, and a detailed explanation thereabout is omitted. It is noted that, similar to the second connector 400 of the aforementioned first embodiment, the second connector 400A of the present embodiment is also configured so that four first axis portions 510, four holding portions 520 and four ditches 540 are grouped into two sets each consisting of two of the first axis portions 510, two of the holding portions 520 and two of the ditches 540.

Referring to FIG. 36, each of the lock levers 600A of the present embodiment is attached to the second housing 500A so as to be rotatable between a lock position LP and an unlock position (not shown). The two lock levers 600A correspond to the two sets, respectively, each of which consists of the two first axis portions 510, the two holding portions 520 and the two ditches 540.

Figure 37:
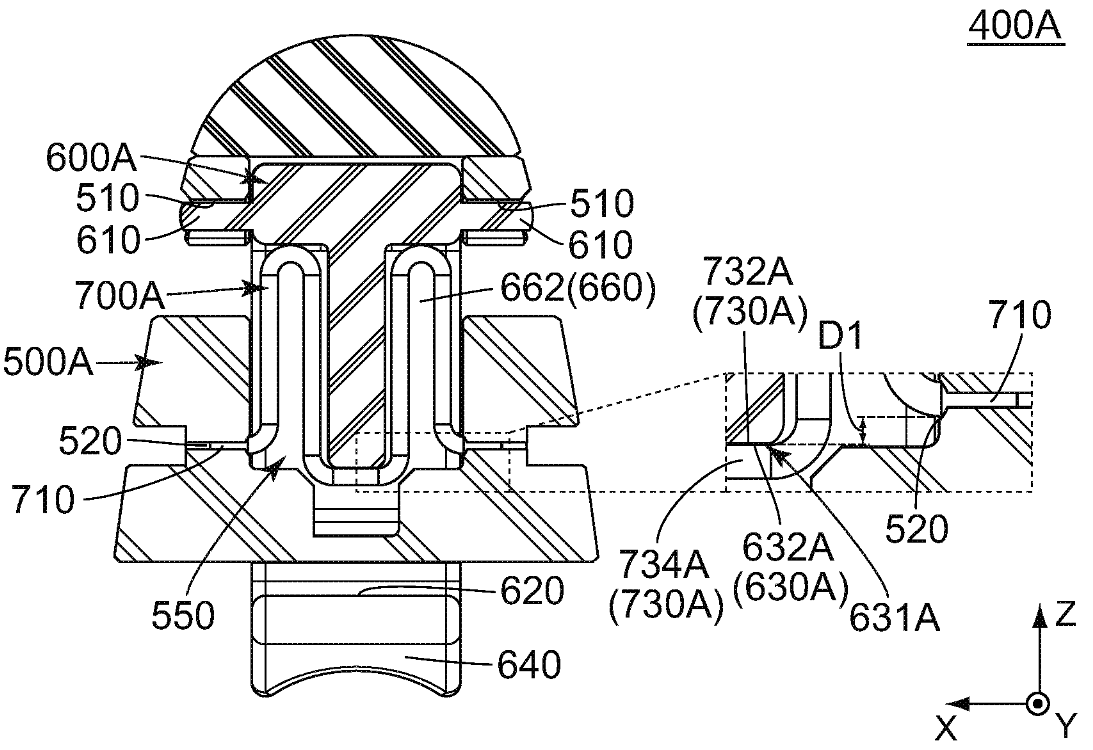
FIG. 37 is a cross-sectional view showing the second connector of FIG. 36, taken along line H-H. In the figure, a part of the second connector is enlarged and illustrated.

Referring to FIGS. 36 and 37, the lock lever 600A of the present embodiment has a structure similar to that of the lock lever 600 of the aforementioned first embodiment except for a hooked portion 630A. Accordingly, components of the lock lever 600A shown in FIGS. 36 and 37 which are same as those of the lock lever 600 of the first embodiment are referred by using reference signs same as those of the lock lever 600 of the first embodiment, and a detailed explanation thereabout is omitted.

Referring to FIG. 36, when the lock lever 600A is positioned at the lock position LP under a mated state where the first connector and the second connector 400A are mated with each other, an engaging portion 620 of the lock lever 600A is positioned beyond an engaged portion of the first connector in the first direction. The second connector 400A is removable from the first connector when the lock lever 600A is positioned at the unlock position under the mated state.

Referring to FIG. 36, the connector assembly of the present embodiment has two sets each consisting of the lock lever 600A, the engaging portion 620, a first abutment portion 640, the spring 700A, the engaged portion of the first connector and a second abutment portion of the first connector. However, the present invention is not limited thereto, but the connector assembly should have a single set of the lock lever 600A, the engaging portion 620, the first abutment portion 640, the spring 700A, the engaged portion and the second abutment portion.

As shown in FIG. 37, the hooked portion 630A of the present embodiment is positioned at a middle of the lock lever 600A in the front-rear direction. The hooked portion 630A is positioned between two second axis portions 610 in the front-rear direction. The hooked portion 630A is positioned around a middle of the lock lever 600A in the up-down direction. Referring to FIGS. 36 and 37, the hooked portion 630A is positioned beyond any of the second axis portions 610 in the first direction. In other words, the hooked portion 630A is positioned below any of the second axis portions 610 in the up-down direction. The hooked portion 630A is positioned beyond the engaging portion 620 in the second direction. In other words, the hooked portion 630A is positioned above the engaging portion 620 in the up-down direction. The hooked portion 630A has a recessed portion 631A. The recessed portion 631A is recessed in the second direction. In other words, the recessed portion 631A is recessed upward in the up-down direction. The recessed portion 631A communicates with the outside of the hooked portion 630A in the front-rear direction. The hooked portion 630A is provided with a first pressed portion 632A and a second pressed portion (not shown). More specifically, a surface, which faces in the first direction, of the recessed portion 631A of the hooked portion 630A functions as the first pressed portion 632A, and a surface, which faces outward in the width direction, of the recessed portion 631A of the hooked portion 630A functions as the second pressed portion. The second pressed portion of the present embodiment has a structure same as that of the second pressed portion 634 of the aforementioned first embodiment. Accordingly, a detailed explanation thereabout is omitted.

Although the hooked portion 630A of the present embodiment has the recessed portion 631A, the present invention is not limited thereto. Specifically, the hooked portion 630A may have, instead of the recessed portion 631A, a hole which pierces the hooked portion 630A in the front-rear direction. In this case, an inner surface, which faces in the first direction, of the hole of the hooked portion 630A functions as the first pressed portion 632A, and an inner surface, which faces outward in the width direction, of the hole of the hooked portion 630A functions as the second pressed portion.

As shown in FIG. 37, the first pressed portion 632A of the present embodiment faces in the first direction. In other words, the first pressed portion 632A faces downward in the up-down direction. The first pressed portion 632A is positioned beyond any of the second axis portions 610 in the first direction. In other words, the first pressed portion 632A is positioned below any of the second axis portions 610 in the up-down direction. The first pressed portion 632A is positioned beyond the engaging portion 620 in the second direction. In other words, the first pressed portion 632A is positioned above the engaging portion 620 in the up-down direction. The first pressed portion 632A is positioned beyond any of the holding portions 520 in the first direction. In other words, the first pressed portion 632A is positioned below any of the holding portions 520 in the up-down direction. Referring to FIG. 37, the first pressed portion 632A is positioned beyond the second pressed portion in the second direction. In other words, the first pressed portion 632A is positioned above the second pressed portion in the up-down direction. Referring to FIGS. 36 and 37, the first pressed portion 632A is positioned outward of any of the second axis portions 610 in the width direction. The first pressed portion 632A is positioned inward of the engaging portion 620 in the width direction. The first pressed portion 632A is positioned outward of the second pressed portion in the width direction.

Referring to FIGS. 36 and 37, when the lock lever 600A is positioned at the lock position LP, the first pressed portion 632A of the lock lever 600A is positioned at a position same as a position of any of the holding portions 520 of the corresponding set in the width direction. When the lock lever 600 is positioned at the unlock position ULP, the first pressed portion 632A of the lock lever 600A is positioned outward of any of the holding portions 520 of the corresponding set in the width direction.

As shown in FIG. 37, the holding portion 520 and the first pressed portion 632A are positioned away from each other by a first distance D1 in the second direction when the lock lever 600A is positioned at the lock position LP. In other words, the first distance D1 is a distance between the holding portion 520 and the first pressed portion 632A in the second direction upon the lock lever 600A being positioned at the lock position LP.

Figure 38:
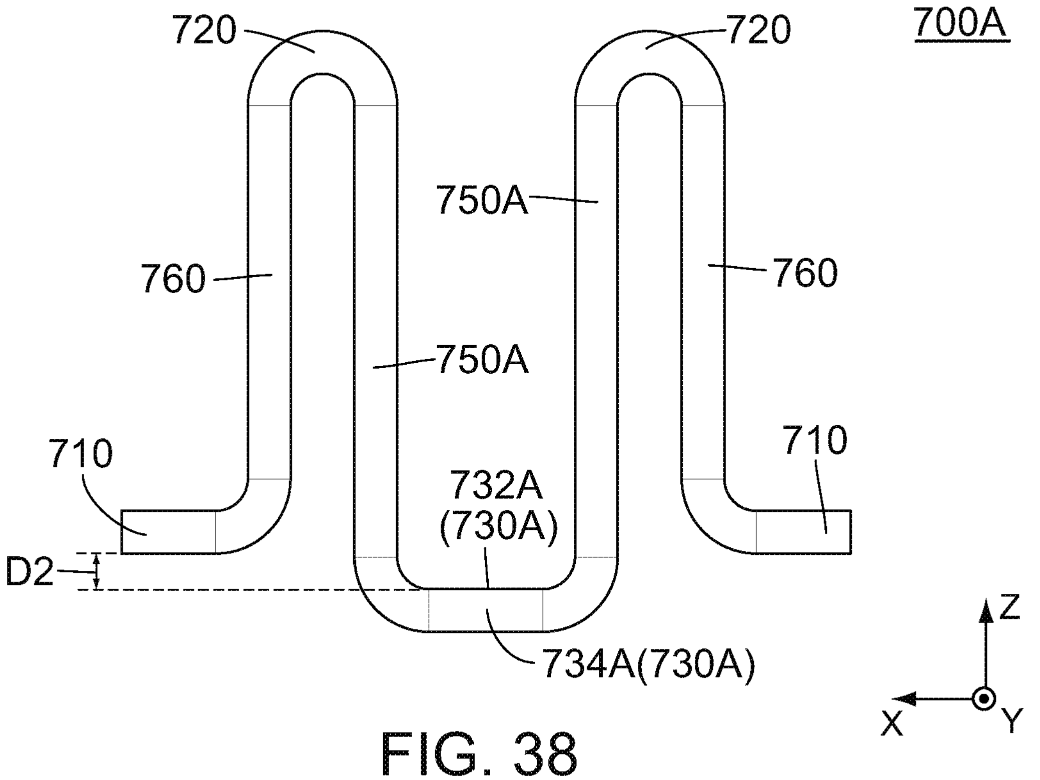
FIG. 38 is a view showing a spring which is included in the second connector of FIG. 37.

Referring to FIG. 38, the spring 700A of the present embodiment is made of metal. The springs 700A is formed by bending a round metal rod. As shown in FIG. 37, the spring 700A is attached to both the second housing 500A and the lock lever 600A.

Referring to FIGS. 36 and 37, the spring 700A urges the lock lever 600A to be moved toward the lock position LP, and the spring 700A urges the second axis portions 610 to be moved in the second direction when the lock lever 600A is positioned at the lock position LP. In other words, the spring 700A urges the lock lever 600A to be moved toward the lock position LP, and the spring 700A urges the second axis portions 610 to be moved upward in the up-down direction when the lock lever 600A is positioned at the lock position LP.

As described above, the connector assembly of the present embodiment is configured as follows: the engaging portion 620 of the lock lever 600A is positioned beyond the engaged portion of the first housing in the first direction when the lock lever 600A is positioned at the lock position LP under the mated state where the first connector and the second connector 400A are mated with each other; the spring 700A is attached to both the second housing 500A and the lock lever 600A; the spring 700A urges the lock lever 600A to be moved toward the lock position LP; and, when the lock lever 600A is positioned at the lock position LP, the spring 700A urges the second axis portions 610 to be moved in the second direction. Accordingly, when the lock lever 600A is positioned at the lock position LP under the mated state where the first connector and the second connector 400A are mated with each other, the engaging portion 620 of the lock lever 600A is pressed against the engaged portion of the first housing of the first connector and thereby both components of the first connector and the second connector 400 are prevented from being unstable. Specifically, the connector assembly of the present embodiment prevents the both components of the first connector and the second connector 400A, which are mated with each other, from being unstable when the connector assembly is used in a high vibration environment.

As shown in FIG. 38, the spring 700A has a substantially M-shape when the spring 700A is viewed alone in the width direction. The spring 700A has two held portions 710, two regulated portions 720, a first pressing portion 732A, a second pressing portion 734A and two arm portions 750A. However, the present invention is not limited thereto, but the number of each of the held portion 710, the regulated portion 720 and the arm portion 750A may be one. In other words, the spring 700A should have the single held portion 710, the single regulated portion 720, the first pressing portion 732A, the second pressing portion 734A and the single arm portion 750A.

The spring 700A of the present embodiment has a structure similar to that of the spring 700 of the aforementioned first embodiment except for the first pressing portion 732A and the second pressing portion 734A and the arm portions 750A. Accordingly, a detailed explanation about components of the spring 700A other than the first pressing portion 732A, the second pressing portion 734A and the arm portion 750A is omitted.

As shown in FIG. 38, the first pressing portion 732A of the present embodiment faces in the second direction. In other words, the first pressing portion 732A faces upward in the up-down direction. The first pressing portion 732A is positioned at a middle of the spring 700A in the front-rear direction. The first pressing portion 732A is positioned beyond any of the regulated portions 720 in the first direction. In other words, the first pressing portion 732A is positioned below any of the regulated portions 720 in the up-down direction. The first pressing portion 732A is positioned beyond any of the held portions 710 in the first direction. In other words, the first pressing portion 732A is positioned below any of the held portions 710 in the up-down direction. When the spring 700A is viewed alone, the held portion 710 and the first pressing portion 732A are positioned away from each other by a second distance D2 in the second direction. In other words, the second distance D2 is a distance between the held portion 710 and the first pressing portion 732A in the second direction upon the spring 700A being viewed alone.

As shown in FIG. 37, each of the held portions 710 is positioned beyond the first pressing portion 732A in the second direction when the lock lever 600A is positioned at the lock position LP. In other words, each of the held portions 710 is positioned above the first pressing portion 732A in the up-down direction when the lock lever 600A is positioned at the lock position LP.

Referring to FIG. 37, when the lock lever 600A is positioned at the lock position LP, the first pressing portion 732A is positioned beyond the first pressed portion 632A in the first direction while the first pressing portion 732A presses the first pressed portion 632A in the second direction. In other words, when the lock lever 600A is positioned at the lock position LP, the first pressing portion 732A is positioned below the first pressed portion 632A in the up-down direction while the first pressing portion 732A presses the first pressed portion 632A upward in the up-down direction.

Referring to FIGS. 37 and 38, in the second connector 400A of the present embodiment, the first distance D1 is longer than the second distance D2. Specifically, in the second connector 400A of the present embodiment which is configured so that the held portion 710 is positioned beyond the first pressing portion 732A in the second direction when the lock lever 600A is positioned at the lock position LP, the first distance D1 is longer than the second distance D2. Accordingly, when the spring 700A is attached to both the second housing 500A and the lock lever 600A, the first pressed portion 632A of the lock lever 600A presses the first pressing portion 732A of the spring 700A in the first direction, or downward in the up-down direction, and thereby the spring 700A is resiliently deformed to have a restoring force. Then, the restoring force generated by the resilient deformation of the spring 700A causes the first pressing portion 732A of the spring 700A to apply a force, which urges the first pressed portion 632A of the lock lever 600A to be moved in the second direction, or upward in the up-down direction, to the first pressed portion 632A of the lock lever 600A.

As shown in FIG. 38, the second pressing portion 734A of the present embodiment is positioned at the middle of the spring 700A in the front-rear direction. The second pressing portion 734A is positioned beyond any of the regulated portions 720 in the first direction. In other words, the second pressing portion 734A is positioned below any of the regulated portions 720 in the up-down direction. The second pressing portion 734A is positioned beyond any of the held portions 710 in the first direction. In other words, the second pressing portion 734A is positioned below any of the held portions 710 in the up-down direction. Referring to FIG. 37, the second pressing portion 734A faces inward in the width direction. The second pressing portion 734A neighbors to the second pressed portion in a direction perpendicular to the first direction. Specifically, the second pressing portion 734A neighbors to the second pressed portion in the width direction perpendicular to the first direction. The second pressing portion 734A is positioned outward of the second pressed portion in the width direction.

As shown in FIG. 38, the arm portions 750A of the present embodiment extend in the first direction from the regulated portions 720, respectively. In other words, each of the arm portions 750A extends downward in the up-down direction from the corresponding regulated portion 720. The arm portions 750A extend in the second direction from the second pressing portion 734A. In other words, each of the arm portions 750A extends upward in the up-down direction from the second pressing portion 734A. The arm portion 750A couples the second pressing portion 734A and the regulated portion 720 with each other. Referring to FIGS. 37 and 38, the hooked portion 630A is positioned between the two arm portions 750A in the front-rear direction. It is noted that, in the first direction, the arm portion 750A of the present embodiment has a length greater than a length of the arm portion 750 of the aforementioned first embodiment.

Referring to FIGS. 36 and 37, when the lock lever 600A is moved from the lock position LP toward the unlock position, the second pressing portion 734A is moved together with the second pressed portion and mainly the arm portions 750A are resiliently deformed so that each of the arm portions 750A has a restoring force. The restoring force generated by the resilient deformation of each of the arm portions 750A causes the second pressing portion 734A to press the second pressed portion and to move the lock lever 600A toward the lock position LP.

As shown in FIG. 38, the spring 700A further has two coupling portions 760. The coupling portion 760 of the present embodiment has a structure same as that of the coupling portion 760 of the aforementioned first embodiment. Accordingly, a detailed explanation thereabout is omitted.

An operation of mating the first connector with the second connector 400A and an operation of releasing the mating of the first connector with the second connector 400A are similar to those of the connector assembly 10 of the aforementioned first embodiment. Accordingly, a detailed explanation thereabout is omitted.

Figure 39:
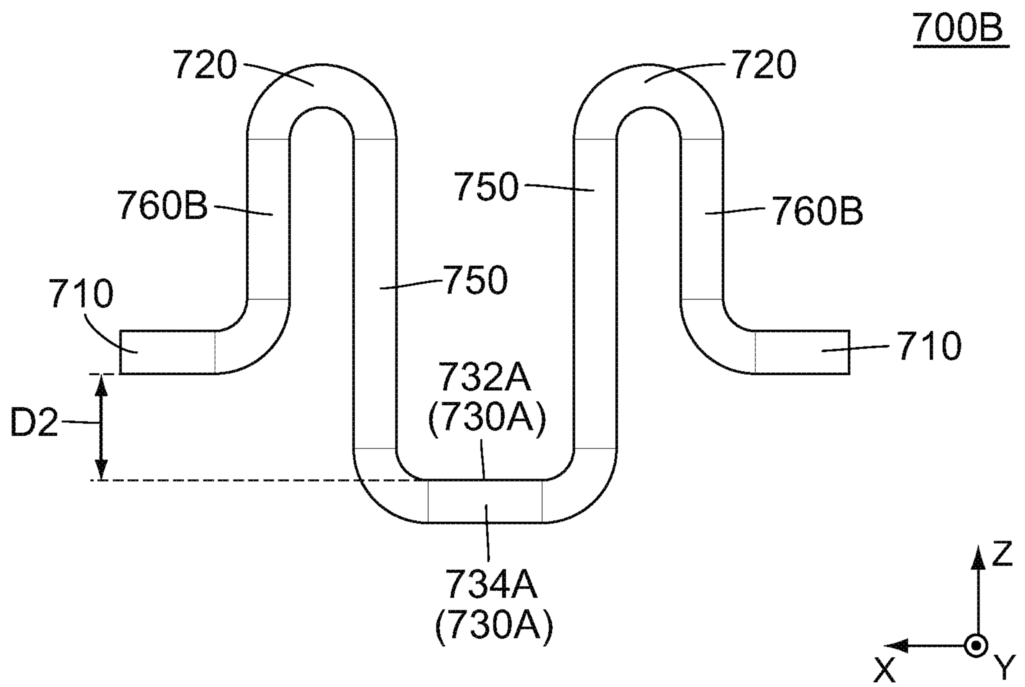
FIG. 39 is a view showing a modification of the spring of FIG. 38.
Figure 40:
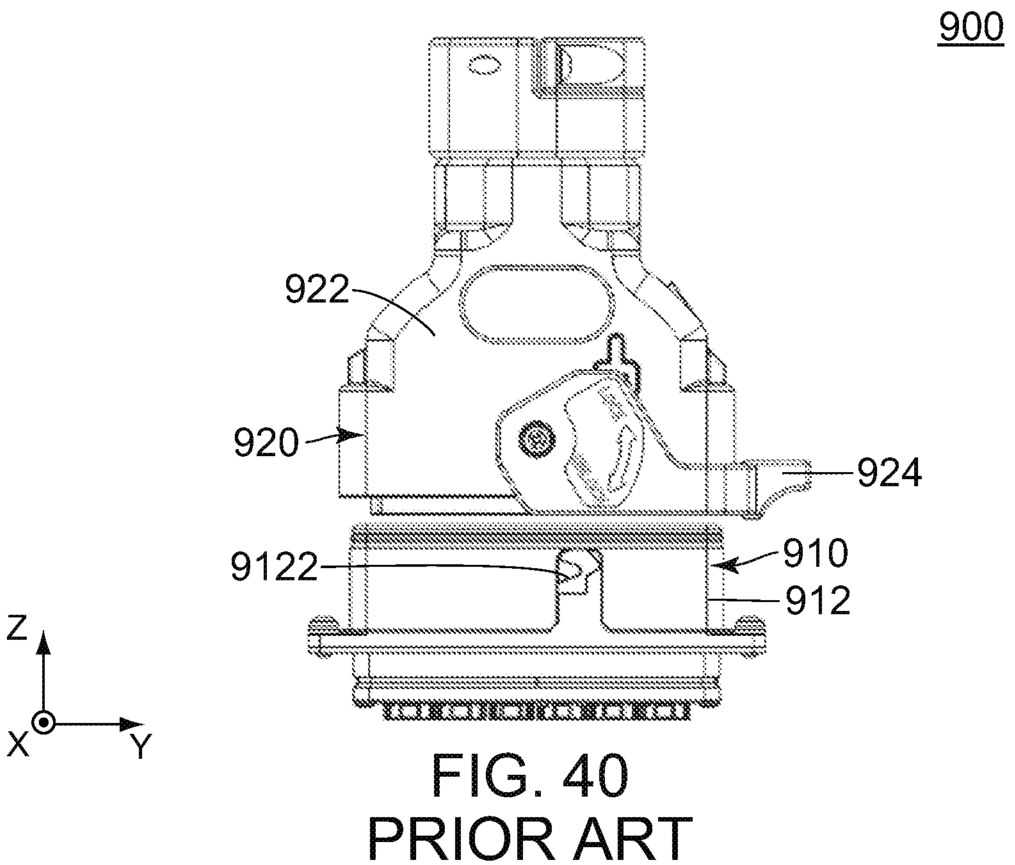
FIG. 40 PRIOR ART
FIG. 40 is a front view showing a lever-type connector of Patent Document 1. In the figure, a receptacle and a plug are in an unmated state where the receptacle and the plug are unmated with each other, and a lever is positioned at an unlock position.
Figure 41:
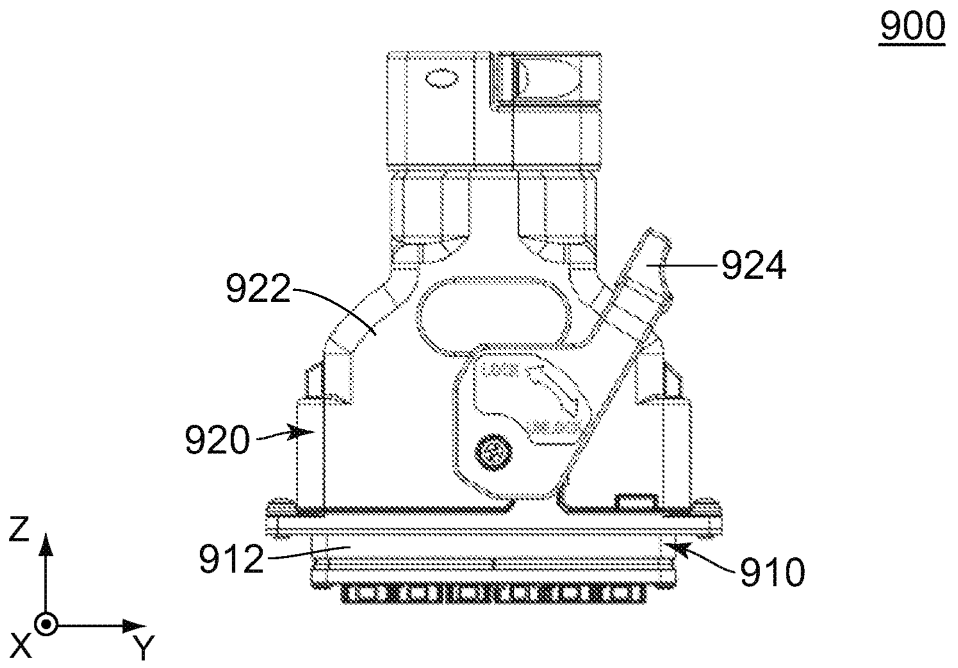
FIG. 41 PRIOR ART
FIG. 41 is another front view showing the lever-type connector of FIG. 40. In the figure, the receptacle and the plug are in a mated state where the receptacle and the plug are mated with each other, and the lever is positioned at a lock position.
Figure 42:
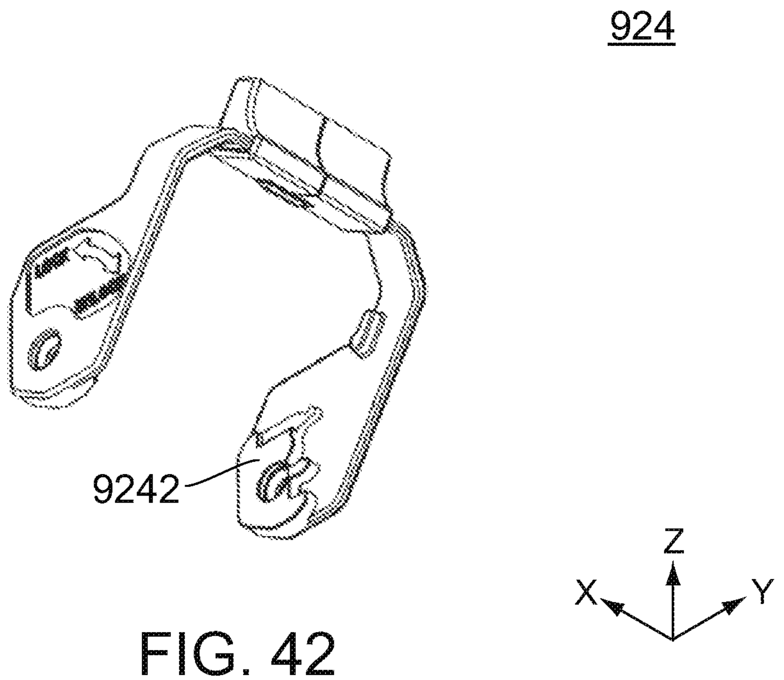
FIG. 42 PRIOR ART
FIG. 42 is a perspective view showing the lever which is include in the lever-type connector of FIG. 41.

The configuration of the spring 700A of the second connector 400A is not limited thereto. For example, the spring 700A may be modified to be a spring 700B of FIG. 39 which comprises, instead of the arm portions 750A and the coupling portions 760, arm portions 750 and coupling portions 760B, wherein the arm portion 750 is shorter than the arm portion 750A while the coupling portion 760B is shorter than the coupling portion 760.

Although the specific explanation about the present invention is made above referring to the embodiments, the present invention is not limited thereto and is susceptible to various modifications and alternative forms.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector assembly comprising a first connector and a second connector, wherein:

the second connector is mateable with the first connector along a first direction;

the second connector is removable from the first connector along a second direction opposite to the first direction;

the first connector comprises a first housing;

the first housing is provided with an engaged portion;

the second connector comprises a second housing, a lock lever and a spring;

the second housing is provided with a first axis portion;

the lock lever is attached to the second housing so as to be rotatable between a lock position and an unlock position;

the lock lever is provided with a second axis portion and an engaging portion;

the second axis portion is combined with the first axis portion;

the engaging portion is positioned beyond the engaged portion in the first direction when the lock lever is positioned at the lock position under a mated state where the first connector and the second connector are mated with each other;

the second connector is removable from the first connector when the lock lever is positioned at the unlock position under the mated state;

the spring is attached to both the second housing and the lock lever;

the spring urges the lock lever to be moved toward the lock position;

when the lock lever is positioned at the lock position, the spring urges the second axis portion to be moved in the second direction;

the second housing is further provided with a holding portion;

the lock lever is further provided with a first pressed portion and a second pressed portion;

one of the second housing and the lock lever is provided with a regulating portion;

the spring has a held portion, a regulated portion, a first pressing portion, a second pressing portion and an arm portion;

the held portion is held by the holding portion;

at least when the lock lever is moved from the lock position toward the unlock position, a movement of the regulated portion is regulated by the regulating portion;

the second connector has a first distance between the holding portion and the first pressed portion in the second direction when the lock lever is positioned at the lock position;

the spring has a second distance between the held portion and the first pressing portion in the second direction when the spring is viewed alone;

if the second connector is configured so that the held portion is positioned beyond the first pressing portion in the first direction when the lock lever is positioned at the lock position, the first distance is shorter than the second distance;

if the second connector is configured so that the held portion is positioned beyond the first pressing portion in the second direction when the lock lever is positioned at the lock position, the first distance is longer than the second distance;

when the lock lever is positioned at the lock position, the first pressing portion is positioned beyond the first pressed portion in the first direction while the first pressing portion presses the first pressed portion in the second direction;

the arm portion couples the second pressing portion and the regulated portion with each other;

the second pressing portion neighbors to the second pressed portion in a direction perpendicular to the first direction;

when the lock lever is moved from the lock position toward the unlock position, the second pressing portion is moved together with the second pressed portion and mainly the arm portion is resiliently deformed so that the arm portion has a restoring force; and the restoring force causes the second pressing portion to press the second pressed portion and to move the lock lever toward the lock position.

2. The connector assembly as recited in claim 1, wherein:
the lock lever is further provided with a hooked portion;
each of the first pressed portion and the second pressed portion is provided on the hooked portion;
the spring further has a pressing section;
each of the first pressing portion and the second pressing portion is a part of the pressing section; and
the pressing section is hooked on the hooked portion.

3. The connector assembly as recited in claim 2, wherein:
the spring further has a coupling portion; and
the coupling portion couples the regulated portion and the held portion with each other.

4. The connector assembly as recited in claim 1, wherein:
the first axis portion is a bearing;
the second axis portion is a rotation axis;
the second housing is formed with a ditch; and
the ditch communicates with the bearing and extends in the first direction.

5. The connector assembly as recited in claim 1, wherein:
the lock lever is further provided with a first abutment portion;
the first abutment portion is positioned beyond the engaging portion in the first direction;
the first housing is further provided with a second abutment portion;
the second abutment portion is positioned beyond the engaged portion in the second direction;
at least one of the first abutment portion and the second abutment portion is an inclined surface which is oblique to the first direction;
when the first connector and the second connector are mated with each other, the first abutment portion abuts against the second abutment portion and the lock lever is temporarily moved from the lock position to the unlock position; and
when the first abutment portion rides over the second abutment portion, the engaging portion is moved beyond the engaged portion in the first direction.

6. The connector assembly as recited in claim 1, wherein:
the first housing is further provided with an intersecting portion;
the intersecting portion has a surface intersecting with the second direction; and
the surface of the intersecting portion neighbors to the engaged portion.

7. A connector assembly comprising a first connector and a second connector, wherein:
the second connector is mateable with the first connector along a first direction;
the second connector is removable from the first connector along a second direction opposite to the first direction;
the first connector comprises a first housing;
the first housing is provided with an engaged portion;
the second connector comprises a second housing, a lock lever and a spring;
the second housing is provided with a first axis portion;
the lock lever is attached to the second housing so as to be rotatable between a lock position and an unlock position;
the lock lever is provided with a second axis portion and an engaging portion;
the second axis portion is combined with the first axis portion;
the engaging portion is positioned beyond the engaged portion in the first direction when the lock lever is positioned at the lock position under a mated state where the first connector and the second connector are mated with each other;
the second connector is removable from the first connector when the lock lever is positioned at the unlock position under the mated state;
the spring is attached to both the second housing and the lock lever;
the spring urges the lock lever to be moved toward the lock position;
when the lock lever is positioned at the lock position, the spring urges the second axis portion to be moved in the second direction;
the first axis portion is a bearing;
the second axis portion is a rotation axis;
the second housing is formed with a ditch; and
the ditch communicates with the bearing and extends in the first direction.

8. The connector assembly as recited in claim 7, wherein:
the lock lever is further provided with a hooked portion;
each of the first pressed portion and the second pressed portion is provided on the hooked portion;
the spring further has a pressing section;
each of the first pressing portion and the second pressing portion is a part of the pressing section; and
the pressing section is hooked on the hooked portion.

9. The connector assembly as recited in claim 8, wherein:
the spring further has a coupling portion; and
the coupling portion couples the regulated portion and the held portion with each other.

10. The connector assembly as recited in claim 7, wherein:
the lock lever is further provided with a first abutment portion;
the first abutment portion is positioned beyond the engaging portion in the first direction;
the first housing is further provided with a second abutment portion;
the second abutment portion is positioned beyond the engaged portion in the second direction;
at least one of the first abutment portion and the second abutment portion is an inclined surface which is oblique to the first direction;
when the first connector and the second connector are mated with each other, the first abutment portion abuts against the second abutment portion and the lock lever is temporarily moved from the lock position to the unlock position; and
when the first abutment portion rides over the second abutment portion, the engaging portion is moved beyond the engaged portion in the first direction.

11. The connector assembly as recited in claim 7, wherein:
the first housing is further provided with an intersecting portion;
the intersecting portion has a surface intersecting with the second direction; and
the surface of the intersecting portion neighbors to the engaged portion.

12. A connector assembly comprising a first connector and a second connector, wherein:
the second connector is mateable with the first connector along a first direction;
the second connector is removable from the first connector along a second direction opposite to the first direction;
the first connector comprises a first housing;
the first housing is provided with an engaged portion;

the second connector comprises a second housing, a lock lever and a spring;

the second housing is provided with a first axis portion;

the lock lever is attached to the second housing so as to be rotatable between a lock position and an unlock position;

the lock lever is provided with a second axis portion and an engaging portion;

the second axis portion is combined with the first axis portion;

the engaging portion is positioned beyond the engaged portion in the first direction when the lock lever is positioned at the lock position under a mated state where the first connector and the second connector are mated with each other;

the second connector is removable from the first connector when the lock lever is positioned at the unlock position under the mated state;

the spring is attached to both the second housing and the lock lever;

the spring urges the lock lever to be moved toward the lock position;

when the lock lever is positioned at the lock position, the spring urges the second axis portion to be moved in the second direction;

the lock lever is further provided with a first abutment portion;

the first abutment portion is positioned beyond the engaging portion in the first direction;

the first housing is further provided with a second abutment portion;

the second abutment portion is positioned beyond the engaged portion in the second direction;

at least one of the first abutment portion and the second abutment portion is an inclined surface which is oblique to the first direction;

when the first connector and the second connector are mated with each other, the first abutment portion abuts against the second abutment portion and the lock lever is temporarily moved from the lock position to the unlock position; and when the first abutment portion rides over the second abutment portion, the engaging portion is moved beyond the engaged portion in the first direction.

13. The connector assembly as recited in claim 12, wherein:

the lock lever is further provided with a hooked portion;

each of the first pressed portion and the second pressed portion is provided on the hooked portion;

the spring further has a pressing section;

each of the first pressing portion and the second pressing portion is a part of the pressing section; and the pressing section is hooked on the hooked portion.

14. The connector assembly as recited in claim 13, wherein:

the spring further has a coupling portion; and the coupling portion couples the regulated portion and the held portion with each other.

15. The connector assembly as recited in claim 12, wherein:

the first housing is further provided with an intersecting portion;

the intersecting portion has a surface intersecting with the second direction; and the surface of the intersecting portion neighbors to the engaged portion.

* * * * *